(12) United States Patent
Ichikawa

(10) Patent No.: US 9,402,037 B2
(45) Date of Patent: Jul. 26, 2016

(54) IMAGING APPARATUS, IMAGE PROCESSING APPARATUS, AND IMAGE PROCESSING METHOD FOR GENERATING RANDOM SPECIAL EFFECTS

(71) Applicant: Olympus Corporation, Hachioji-shi, Tokyo (JP)

(72) Inventor: Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/261,086

(22) Filed: Apr. 24, 2014

(65) Prior Publication Data

US 2014/0320692 A1  Oct. 30, 2014

(30) Foreign Application Priority Data

Apr. 26, 2013  (JP) ................................ 2013-094412

(51) Int. Cl.
| | |
|---|---|
| *H04N 5/232* | (2006.01) |
| *H04N 5/357* | (2011.01) |
| *H04N 5/262* | (2006.01) |
| *H04N 5/235* | (2006.01) |
| *H04N 5/217* | (2011.01) |

(52) U.S. Cl.
CPC ........... *H04N 5/2621* (2013.01); *H04N 5/2171* (2013.01); *H04N 5/2178* (2013.01); *H04N 5/2351* (2013.01); *H04N 5/23212* (2013.01); *H04N 5/23229* (2013.01); *H04N 5/3572* (2013.01)

(58) Field of Classification Search
USPC ................... 348/220.1, 222.1, 223.1, 239
See application file for complete search history.

(56) References Cited

U.S. PATENT DOCUMENTS

| | | | |
|---|---|---|---|
| 5,751,864 A | * | 5/1998 | Moriwake et al. ............ 382/276 |
| 6,546,187 B1 | * | 4/2003 | Miyazaki et al. ............. 386/224 |
| 2001/0013869 A1 | * | 8/2001 | Nozawa ........................ 345/473 |
| 2007/0024631 A1 | * | 2/2007 | Cazier et al. .................. 345/581 |
| 2012/0162479 A1 | * | 6/2012 | Okamura ............. G11B 27/036 348/239 |

FOREIGN PATENT DOCUMENTS

| | | |
|---|---|---|
| JP | 2010-62836 | 3/2010 |
| JP | 2010-74244 | 4/2010 |

* cited by examiner

*Primary Examiner* — Twyler Haskins
*Assistant Examiner* — Akshay Trehan
(74) *Attorney, Agent, or Firm* — John C. Pokotylo; Straub & Pokotylo

(57) ABSTRACT

An imaging apparatus includes an imaging unit, a random seed generating unit, a pseudo-random number generating unit, and a special image processing unit. The imaging unit photographs a subject to obtain image data. The random seed generating unit generates a random seed to decide a pseudo-random number sequence. The pseudo-random number generating unit generates a pseudo-random number in accordance with the generated random seed. The special image processing unit performs special image processing to apply a special effect to the image data based on the generated pseudo-random number. The random seed is decided during photography.

20 Claims, 21 Drawing Sheets

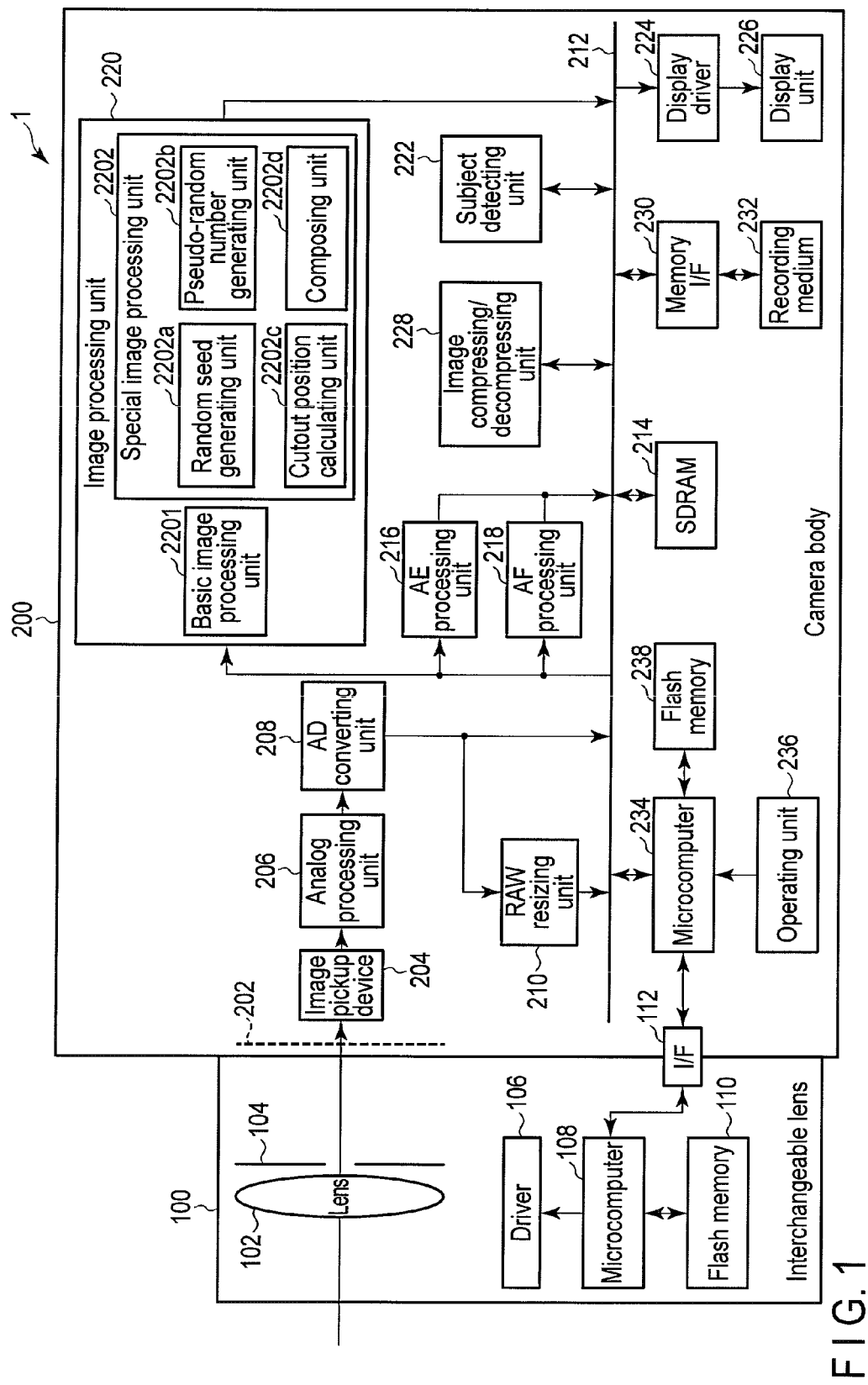
F I G. 1

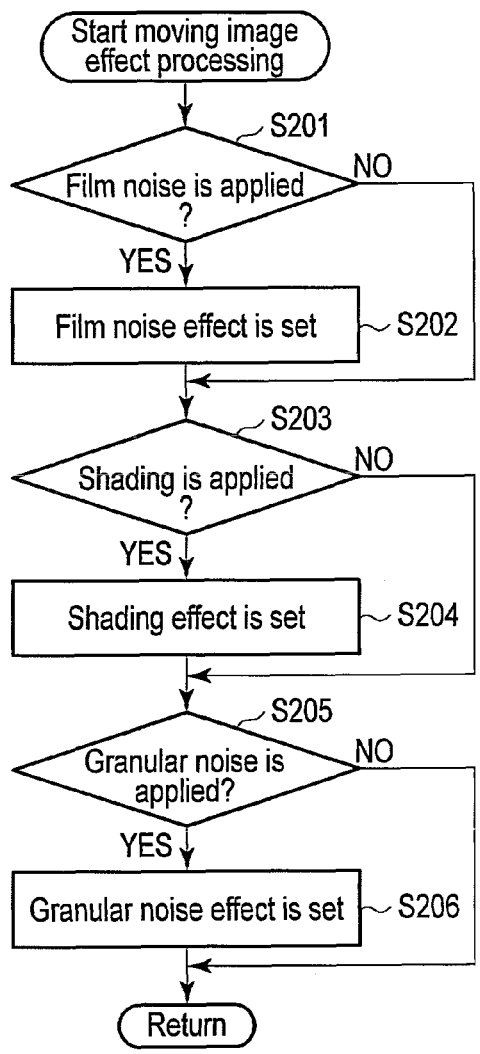
F I G. 3
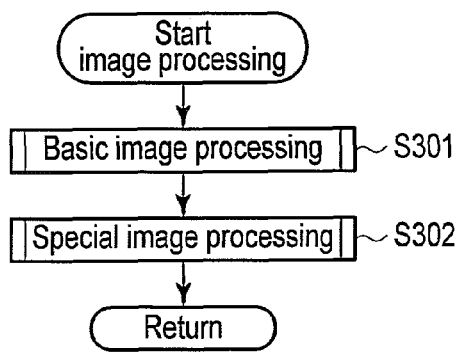
F I G. 4

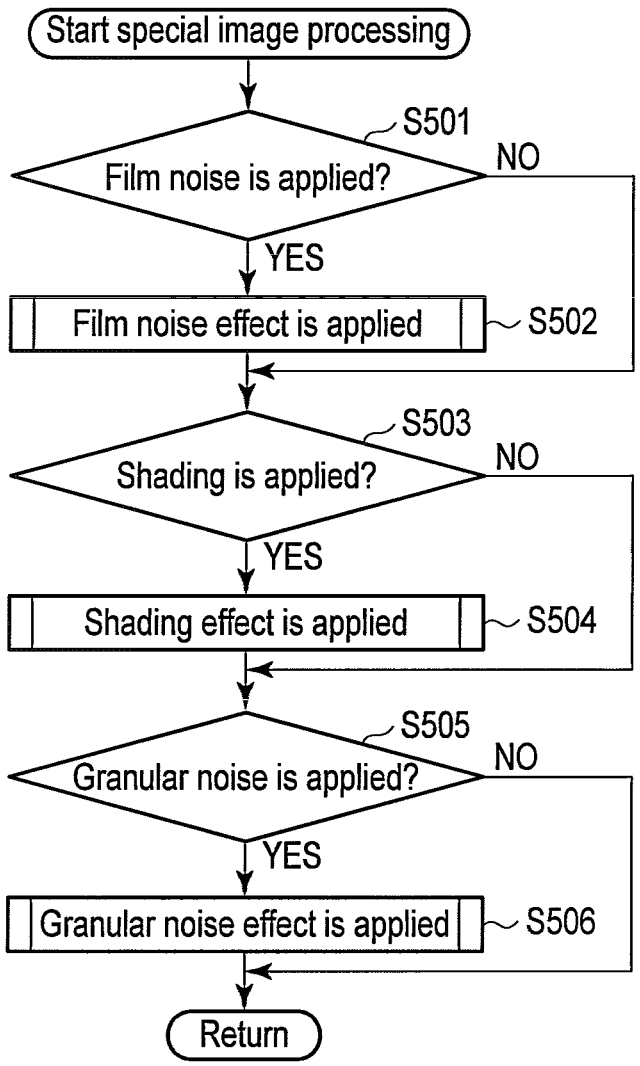
F I G. 6

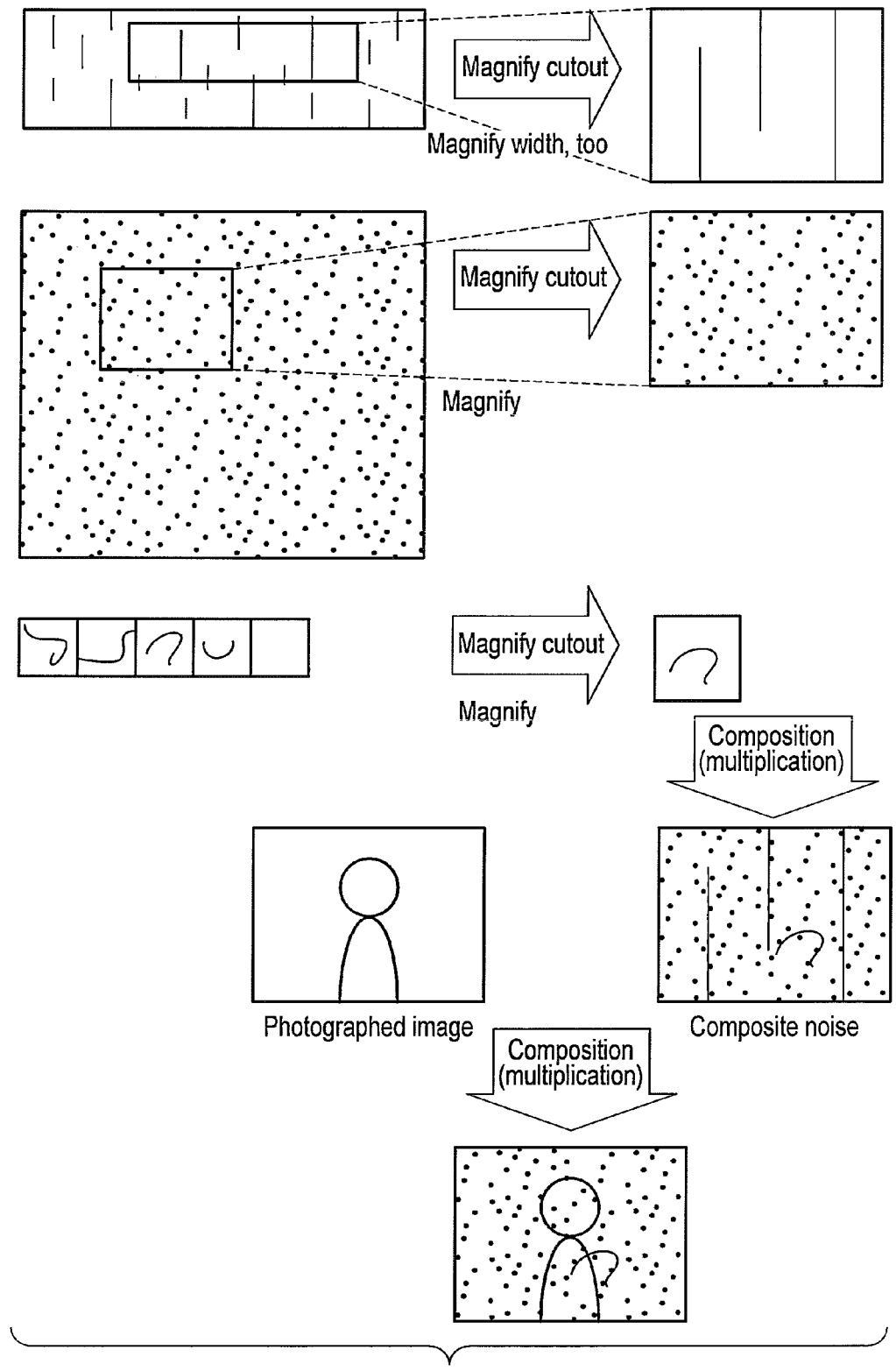
F I G. 18

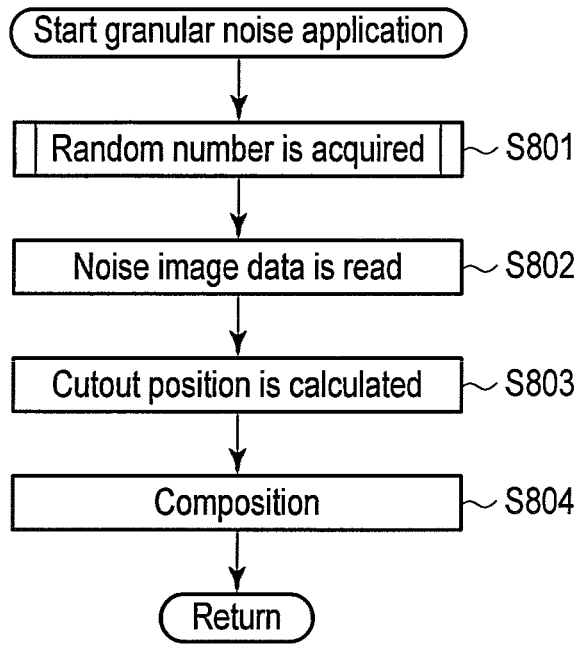
F I G. 21
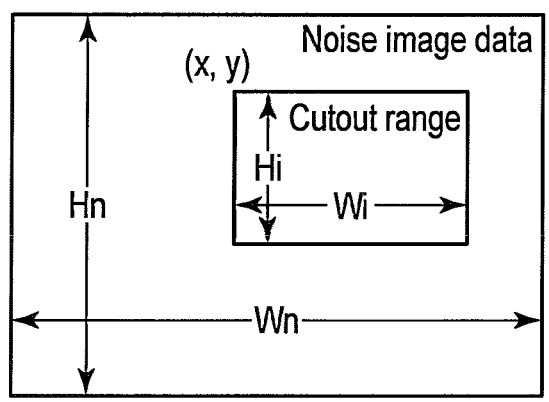
F I G. 22

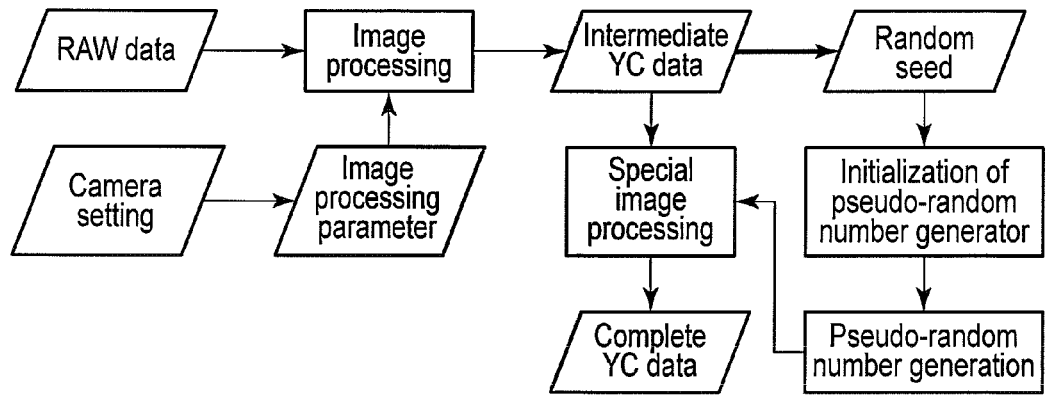
F I G. 27
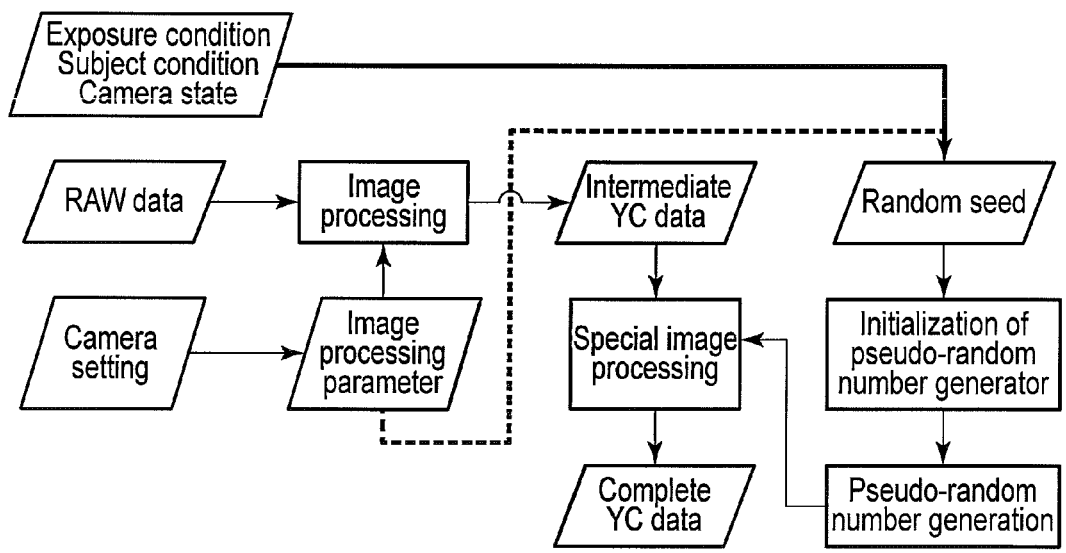
F I G. 28

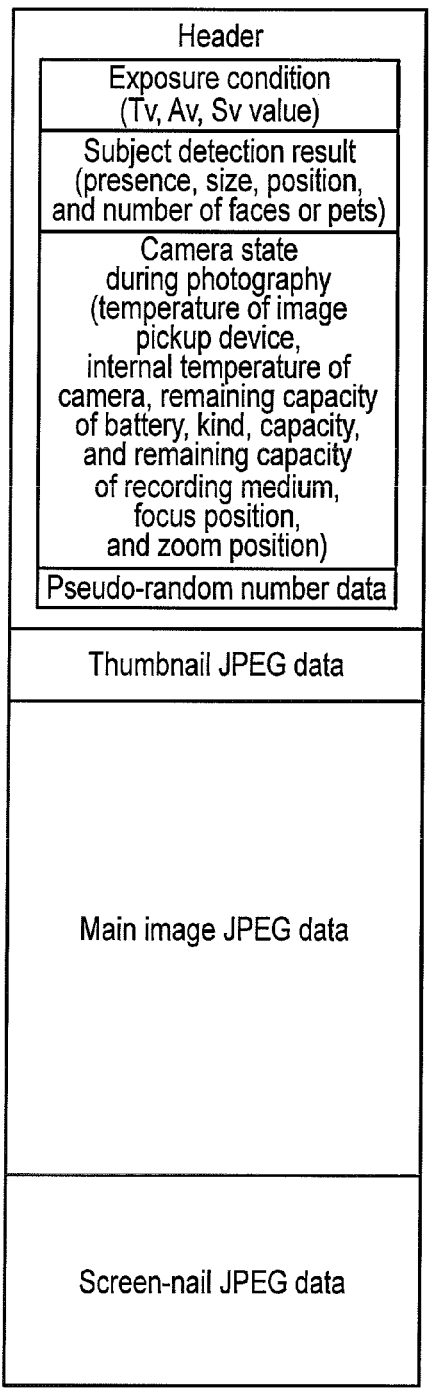
F I G. 29A
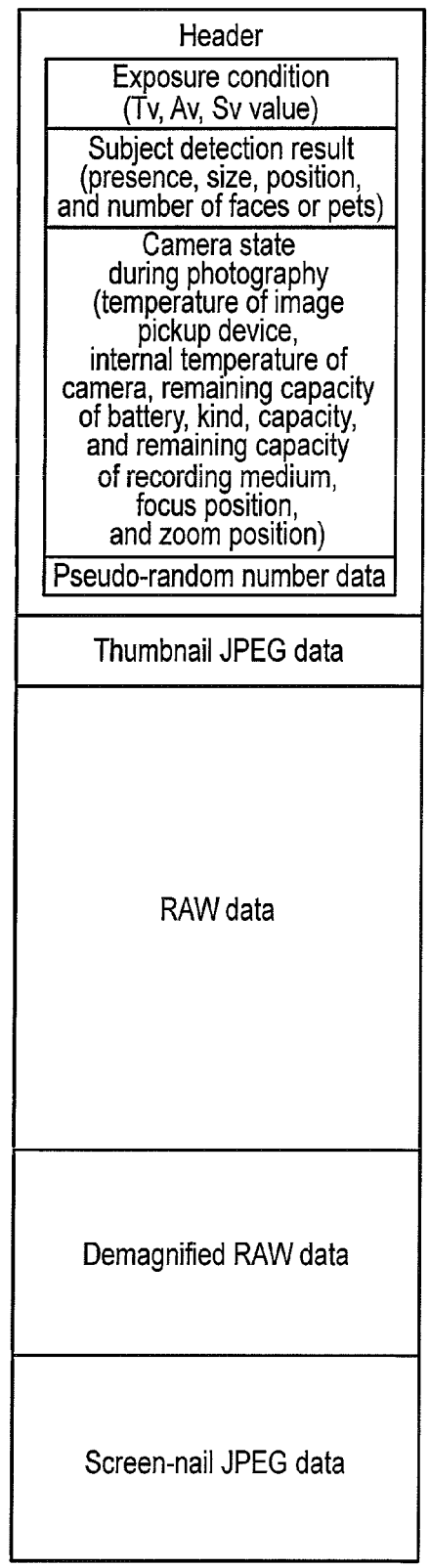
F I G. 29B

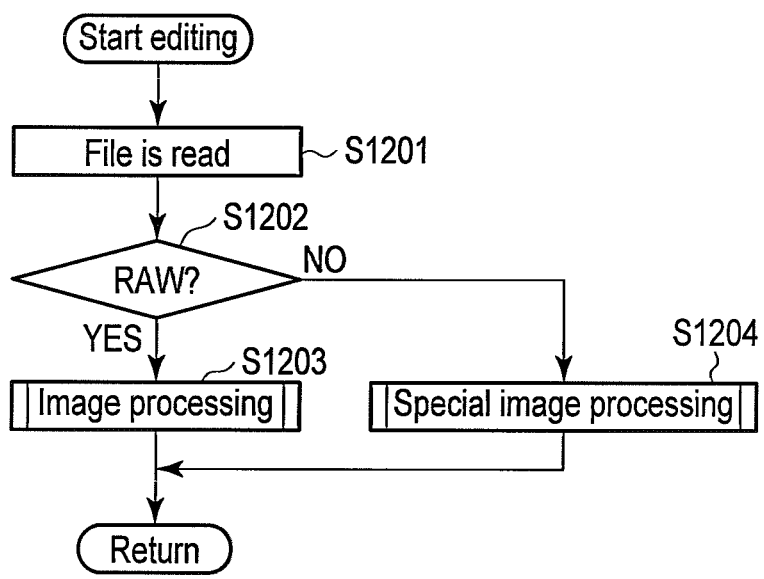
F I G. 31

IMAGING APPARATUS, IMAGE PROCESSING APPARATUS, AND IMAGE PROCESSING METHOD FOR GENERATING RANDOM SPECIAL EFFECTS

CROSS-REFERENCE TO RELATED APPLICATIONS

This application is based upon and claims the benefit of priority from the prior Japanese Patent Application No. 2013-094412, filed Apr. 26, 2013, the entire contents of which are incorporated herein by reference.

BACKGROUND OF THE INVENTION

1. Field of the Invention

The present invention relates to an imaging apparatus and an image processing apparatus capable of special image processing, and an image processing method therefor.

2. Description of the Related Art

There have been developed a large number of imaging apparatuses having the function of subjecting image data obtained by photography to special image processing. A large number of techniques associated with the special image processing have also been suggested. For example, Jpn. Pat. Appln. KOKAI Publication No. 2010-62836 has suggested a method of generating a high-contrast image which has a granular feeling (noise feeling) as in a film image. The method according to Jpn. Pat. Appln. KOKAI Publication No. 2010-62836 enables the photography of still images and moving images having a rough and strong impression. Moreover, Jpn. Pat. Appln. KOKAI Publication No. 2010-74244 has suggested a method of generating an image which is darkened in its periphery. The method according to Jpn. Pat. Appln. KOKAI Publication No. 2010-74244 enables the photography of still images and moving images that seem to have been photographed with a toy camera.

BRIEF SUMMARY OF THE INVENTION

According to a first aspect of the invention, there is provided an imaging apparatus comprising: an imaging unit which photographs a subject to obtain image data; a random seed generating unit which generates a random seed to decide a pseudo-random number sequence; a pseudo-random number generating unit which generates a pseudo-random number in accordance with the generated random seed; and a special image processing unit which performs special image processing to apply a special effect to the image data based on the generated pseudo-random number, wherein the random seed is decided during photography.

According to a second aspect of the invention, there is provided an image processing apparatus comprising: a random seed generating unit which generates a random seed to decide a pseudo-random number sequence; a pseudo-random number generating unit which generates a pseudo-random number in accordance with the generated random seed; and a special image processing unit which performs special image processing to apply a special effect to image data based on the generated pseudo-random number, wherein the random seed is decided during the acquisition of the image data.

According to a third aspect of the invention, there is provided an image processing method comprising: generating a random seed by use of information obtained during an acquisition of image data in response to an instruction to perform special image processing for the image data; generating a pseudo-random number in accordance with the generated random seed; and performing special image processing to apply a special effect to the image data on based on the generated pseudo-random number.

According to a fourth aspect of the invention, there is provided a non-transitory recording medium on which an image processing program causing a computer to execute: generating a random seed by use of information obtained during an acquisition of image data in response to an instruction to perform special image processing for the image data; generating a pseudo-random number in accordance with the generated random seed; and performing special image processing to apply a special effect to the image data on based on the generated pseudo-random number.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a digital camera as an example of an imaging apparatus comprising an image processing apparatus according to one embodiment of the present invention;

FIG. 3 is a flowchart showing effect setting processing;

FIG. 4 is a flowchart showing image processing;

FIG. 6 is a flowchart showing special image processing;

FIG. 18 is a diagram showing an overview of composing processing in which the sizes of the scratch image data and the noise image data after the cutout do not correspond to the size of image data to be composed;

FIG. 21 is a flowchart showing processing to apply a granular noise effect;

FIG. 22 is a graph showing the relation between Wn, Hn, Wi, and Hi;

FIG. 27 is a conceptual diagram showing the flow of a procedure for generating a random seed by use of YC data obtained by subjecting RAW data to the basic image processing to perform the special image processing;

FIG. 28 is a conceptual diagram showing the flow of a procedure for generating a random seed by use of various conditions during photography to perform the special image processing;

FIG. 29A and FIG. 29B are diagrams showing file structures of image files when information for generating a random seed is recorded in an image file;

FIG. 31 is a flowchart showing editing processing.

DETAILED DESCRIPTION OF THE INVENTION

Figure 2A:
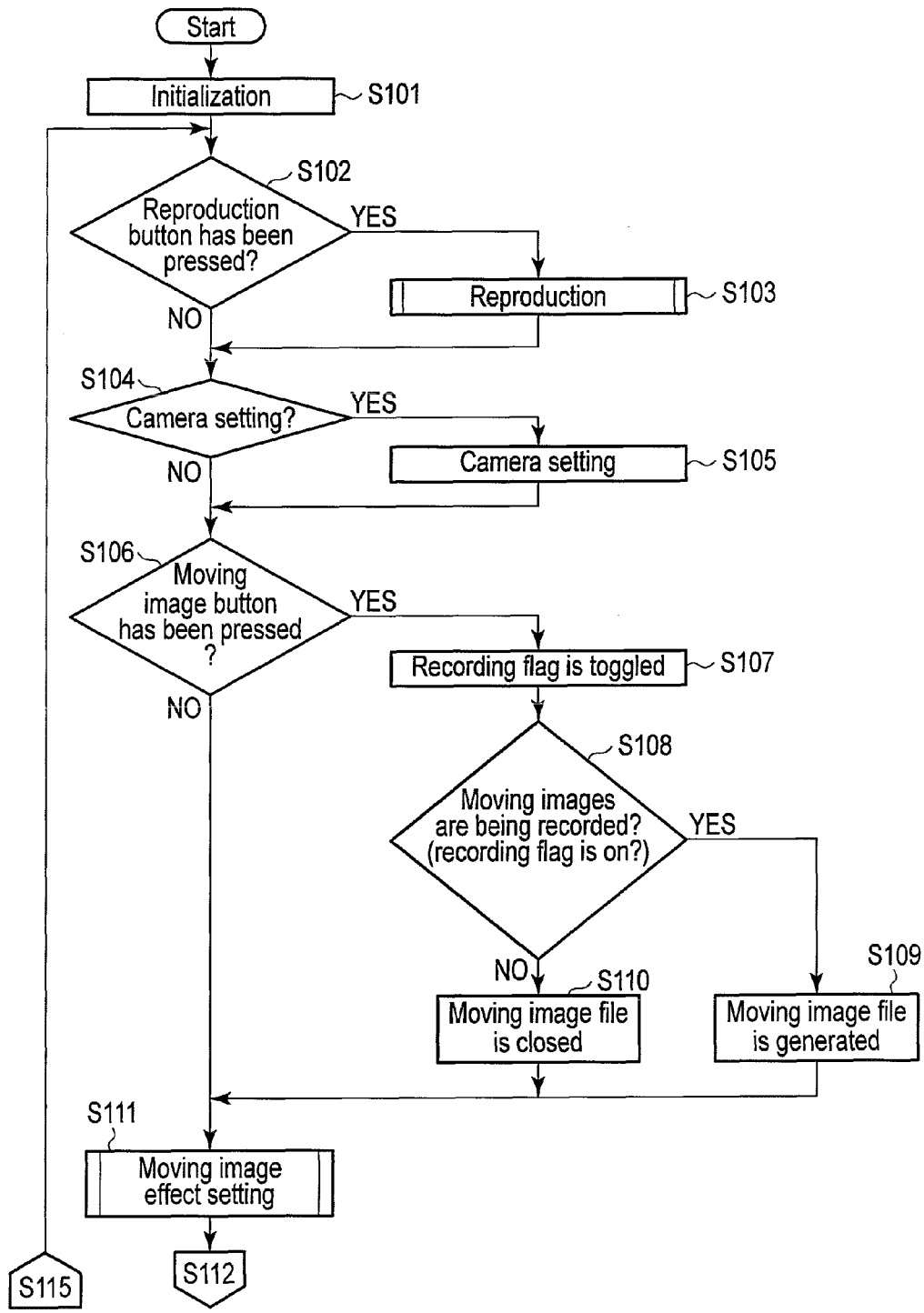
FIGS. 2A and 2B are flowcharts showing the main operation of the digital camera according to one embodiment of the present invention.

Hereinafter, embodiments of the present invention will be described with reference to the drawings. FIG. 1 is a block diagram showing the configuration of a digital camera as an example of an imaging apparatus comprising an image processing apparatus according to one embodiment of the present invention. A digital camera 1 shown in FIG. 1 is a digital camera having an interchangeable lens. However, the digital camera 1 does not necessarily have to be a digital camera having an interchangeable lens, and may be a digital camera having an integral lens. The technique according to the present embodiment is also applicable to, for example, a mobile telephone having an imaging function, or a portable terminal having an imaging function.

The digital camera 1 shown in FIG. 1 includes an interchangeable lens 100 and a camera body 200. The interchangeable lens 100 is configured to be removable from the camera body 200. When the interchangeable lens 100 is attached to the camera body 200, the interchangeable lens 100 is connected to the camera body 200 in communication with each other. As a result, the interchangeable lens 100 is operable under the control of the camera body 200.

The interchangeable lens 100 includes a lens 102, a diaphragm 104, a driver 106, a microcomputer 108, and a flash memory 110.

The lens 102 is an optical system for collecting a light flux from an unshown subject to an image pickup device 204 in the camera body 200. The lens 102 has lenses such as a focus lens and a zoom lens. The diaphragm 104 is configured to open and shut, and adjusts the amount of the light flux which has entered via the lens 102. The driver 106 has a motor and such like. Under the control of the microcomputer 108, the driver 106 drives the focus lens and the zoom lens in the lens 102 in its optical axis direction, and drives the diaphragm 104 to open and shut.

The microcomputer 108 is connected to a microcomputer 234 in the camera body 200 via an interface (I/F) 112 in communication with each other when the interchangeable lens 100 is connected to the camera body 200. This microcomputer 108 drives the driver 106 under the control of the microcomputer 234. The microcomputer 108 communicates lens information regarding the interchangeable lens 100 stored in the flash memory 110 to the microcomputer 234 via the I/F 112.

Lens information such as aberration information regarding the lens 102, and programs necessary to execute the operation of the interchangeable lens 100 are stored in the flash memory 110.

The camera body 200 has a mechanical shutter 202, the image pickup device 204, an analog processing unit 206, an analog/digital (AD) converting unit 208, a RAW resizing unit 210, a bus 212, an SDRAM 214, an AE processing unit 216, an AF processing unit 218, an image processing unit 220, a subject detecting unit 222, a display driver 224, a display unit 226, an image compressing/decompressing unit 228, a memory interface (I/F) 230, a recording medium 232, the microcomputer 234, an operating unit 236, and a flash memory 238.

The mechanical shutter 202 is configured to move a photoelectric conversion surface of the image pickup device 204 into a shaded state or an exposed state. The exposure time of the image pickup device 204 is adjusted by the movement of the mechanical shutter 202.

The image pickup device 204 has the photoelectric conversion surface on which the light flux from the subject collected via the lens 102 is formed into an image. The photoelectric conversion surface is configured by two-dimensionally arrayed pixels. A color filter is provided on the light entrance side of the photoelectric conversion surface. This image pickup device 204 converts a figure (subject figure) corresponding to the light flux formed on the photoelectric conversion surface to an electric signal (hereinafter referred to as an image signal) corresponding to the light amount, and then outputs the electric signal. Here, image pickup devices having various configurations of, for example, a CCD type and CMOS type are known as the image pickup device 204. Various arrangements such as a Bayer arrangement are known as color arrangements of the color filter. In the present embodiment, the configuration of the image pickup device 204 is not limited to a particular configuration, and image pickup devices having various configurations can be used. The image pickup device 204 may have an electronic shutter function to electronically control the exposure time. In the following explanation, the image pickup device 204 has the electronic shutter function.

The analog processing unit 206 subjects the image signal obtained by the image pickup device 204 to analog processing such as correlated double sampling (CDS) processing and automatic gain control (AGC) processing. The AD converting unit 208 converts the image signal analog-processed in the analog processing unit 206 to a digital signal (hereinafter referred to as RAW data). Here, the RAW data is "raw" image data before being subjected to image processing in the image processing unit 220.

Here, the image pickup device 204, the analog processing unit 206, and the AD converting unit 208 function as an imaging unit.

The RAW resizing unit 210 resizes the RAW data obtained in the AD converting unit 208. The resizing is performed by interpolation. When demagnifying processing is performed as the resizing processing, for example, processing which uses the average value of adjacent pixels as data regarding the pixels after the demagnification is performed for each of the pixels constituting the RAW data. When magnifying processing is performed as the resizing processing, for example, processing which inserts the pixel having the average value of adjacent pixels into the adjacent pixels is performed for each of the pixels constituting the RAW data. As shown in FIG. 1, the AD converting unit 208 is connected to the bus 212 via the RAW resizing unit 210, and is also connected to the bus 212 without passing through the RAW resizing unit 210. Therefore, in the present embodiment, both the RAW data after resized in the RAW resizing unit 210 and the RAW data before resized in the RAW resizing unit 210 can be acquired. The RAW resizing unit 210 may be configured to resize the RAW data stored in the SDRAM 214 instead of resizing the RAW data output from the AD converting unit 208. In addition to the methods described above, various interpolation methods such as nearest neighbor interpolation and linear interpolation are applicable to the interpolation processing performed in the RAW resizing unit 210.

The bus 212 is a transfer channel for transferring various data generated inside the camera body 200. The SDRAM 214 is a storage unit for temporarily storing various data generated inside the camera body 200. This SDRAM 214 is also used as a buffer memory for image processing in the image processing unit 220.

The AE processing unit 216 calculates subject luminance by using image data (e.g., the RAW data). The AF processing unit 218 extracts signals of a high-frequency component from the image data (e.g., the RAW data), and adds up the extracted signals of the high-frequency component to acquire an AF evaluation value.

The image processing unit 220 performs various kinds of image processing for the RAW data. Here, the image processing performed in the image processing unit 220 is image processing such that the finish of the image data and an effect thereon will be a predetermined finish and effect. The finish here refers to, for example, an appearance and a style during display. The effect refers to, for example, an effect which provides a predetermined impression to a user during display. This image processing unit 220 has a basic image processing unit 2201 and a special image processing unit 2202.

The basic image processing unit 2201 subjects the image data to basic image processing necessary to display or record images. This basic image processing includes, for example, optical black (OB) subtraction processing, white balance (WB) correction processing, synchronization processing, color reproduction processing, luminance changing processing, edge enhancement processing, and noise reduction processing. The optical black subtraction processing is processing for subtracting and removing a dark current component (optical black) of the RAW data. The white balance correction processing is processing for amplifying each color component of the RAW data in a predetermined gain amount to correct the color balance of the image. The synchronization processing is processing for converting image data in which one pixel corresponds to one color component, such as the raw data output via the image pickup device 204 in accordance with the Bayer arrangement, to RGB data in which one pixel corresponds to more than one color component. The color reproduction processing includes various kinds of processing such that the color reproduction of an image will be appropriate. This processing is, for example, color matrix calculation processing. This color matrix calculation processing is processing for multiplying the RGB data by, for example, a color matrix coefficient corresponding to a white balance mode. In addition, the corrections of saturation and hue are also made as the color reproduction processing. The luminance changing processing is processing for converting the RGB data to YC (luminance and color difference) data, and changing the luminance characteristics of Y data so that the luminance characteristics will be suitable to display and recording. The luminance characteristics of the RGB data may be changed as the luminance changing processing. The edge enhancement processing is processing for multiplying, by an edge enhancement coefficient, an edge signal extracted from the image data (the RAW data, the RGB data, or the YC data) by use of, for example, a band pass filter, and adding the result to the original image data to enhance an edge (outline) component in the image data. The noise reduction processing is processing for removing a noise component in the image data (the RGB data or the YC data) by, for example, coring processing.

The special image processing unit 2202 subjects the image data (the RGB data or the YC data) to special image processing to provide a special visual effect. The special image processing unit 2202 in the present embodiment performs processing to apply at least a noise effect as the special image processing. The noise effect is an effect to apply predetermined noise to the image to provide a predetermined impression (e.g., an impression of an image as if it has been obtained by film photography) to the user. To perform the processing to apply the noise effect, the special image processing unit 2202 includes a random seed generating unit 2202a, a pseudo-random number generating unit 2202b, a cutout position calculating unit 2202c, and a composing unit 2202d. The random seed generating unit 2202a generates a random seed for initializing a pseudo-random number sequence. The pseudo-random number generating unit 2202b has a pseudo-random number generator, and generates a pseudo-random number sequence in accordance with the random seed generated in the random seed generating unit 2202a. Here, the pseudo-random number sequence is a sequence having pseudo-randomness, and is a sequence which is characterized in that the same sequence is generated from the same random seed. A linear congruential method, an XOR shift method, and a Mersenne Twister method are known as methods of generating the pseudo-random numbers. In the present embodiment, the generating method is not particularly limited as long as a pseudo-random number sequence can be generated. The cutout position calculating unit 2202c calculates cutout positions of scratch image data and noise image data which are image data necessary to apply the noise effect by using the pseudo-random number sequence generated in the pseudo-random number generating unit 2202b. The scratch image data and the noise image data will be described in detail later. The composing unit 2202d cuts out parts of the scratch image data and the noise image data in accordance with the cutout positions calculated in the cutout position calculating unit 2202c, magnifies the scratch image data and the noise image data that have been cut out as needed, and then composes (superimposes) the data on the image data to which the noise effect is to be applied. The composing unit 2202d also composes (superimposes) dust image data used as needed to apply the noise effect on the image data to which the noise effect is to be applied.

The subject detecting unit 222 detects a subject (e.g., a human face) in the image data (e.g., YC data). When the subject is a face, the face can be detected by a known face detection technique such as template matching. Even a subject other than the face can be detected by a known method such as the template matching or characteristic amount detection.

The display driver 224 resizes, in accordance with the display size of the display unit 226, the image data obtained in the image processing unit 220 or an image data obtained by decompression in the image compressing/decompressing unit 228, and converts the resized image data to a video signal, and then outputs the video signal to the display unit 226. The display unit 226 is, for example, a liquid crystal display (LCD). The display unit 226 displays an image based on the video signal input from the display driver 224.

In the recording of the image, the image compressing/decompressing unit 228 subjects the image data obtained by the image processing in the image processing unit 220 to still image compressing processing in a JPEG format or TIFF format or to moving image compressing processing in an MPEG format or an H.264 format. The image compressing/decompressing unit 228 decompresses the compressed image data during the reproduction of the image.

The I/F 230 is an interface for the microcomputer 234 and such like to access the recording medium 232. The recording medium 232 is, for example, a memory card removable from the camera body 200. Image files, for example, are recorded in the recording medium 232. The image file is a file in which header information is added to the image data compressed by the image compressing/decompressing unit 228. The recording medium 232 may be fixed to the camera body 200 (may be unremovable).

The microcomputer 234 has overall control of the operation of each of the components of the camera body 200 including the mechanical shutter 202, the image pickup device 204, and the display driver 224. The microcomputer 234 also performs AE processing using the subject luminance calculated in the AE processing unit 216, and AF processing using the AF evaluation value calculated in the AF processing unit 218. Moreover, the microcomputer 234 also controls the operation of the interchangeable lens 100 when the interchangeable lens 100 is attached.

The operating unit 236 includes various operational components to be operated by the user. For example, the operating unit 236 in the present embodiment has, as the operational components, a release button, a moving image button, a menu button, a reproduction button, and a power button. The release button has a two-step switch for a first (1st) release switch and a second (2nd) release switch. When the release button is pressed halfway by the user and the first release switch is turned on accordingly, the microcomputer 234 performs photographic preparation processing such as AE processing and AF processing. When the release button is fully pressed and the second release switch is turned on accordingly, the microcomputer 234 performs still image recording processing. The moving image button instructs the microcomputer 234 to perform moving image photography. When the moving image button is pressed, the microcomputer 234 performs moving image recording processing. When the moving image button is pressed during the execution of the moving image recording processing, the microcomputer 234 finishes the moving image recording processing. The menu button is an operation unit for instructing to display a menu screen. On the menu screen, the user can change various settings of the camera body 200. In the present embodiment, the user sets, for example, a special image processing mode on the menu screen. In accordance with this special image processing mode, the contents of the special image processing applied in the special image processing unit 2202 are set. The reproduction button is an operation unit for instructing the microcomputer 234 to reproduce a still image file or a moving image file. The power button is an operation unit for instructing to turn on or off the camera body 200. Here, functions equivalent to the release button, the moving image button, the menu button, and the reproduction button described above may be provided by a touch panel. That is, there may be no physical operational components such as the buttons.

Various parameters necessary for the operation of the camera body 200 are stored in the flash memory 238, such as parameters necessary for the operation of the image processing unit 220: a white balance gain for a white balance correction, color matrix coefficient for a color matrix calculation, and various functions (gamma functions) for changing the luminance. Here, the scratch image data, the noise image data, and the dust image data are stored in the flash memory 238 according to the present embodiment as the parameters necessary for the special image processing in the image processing unit 220. Various programs to be executed by the microcomputer 234 are also stored in the flash memory 238.

Figure 2B:
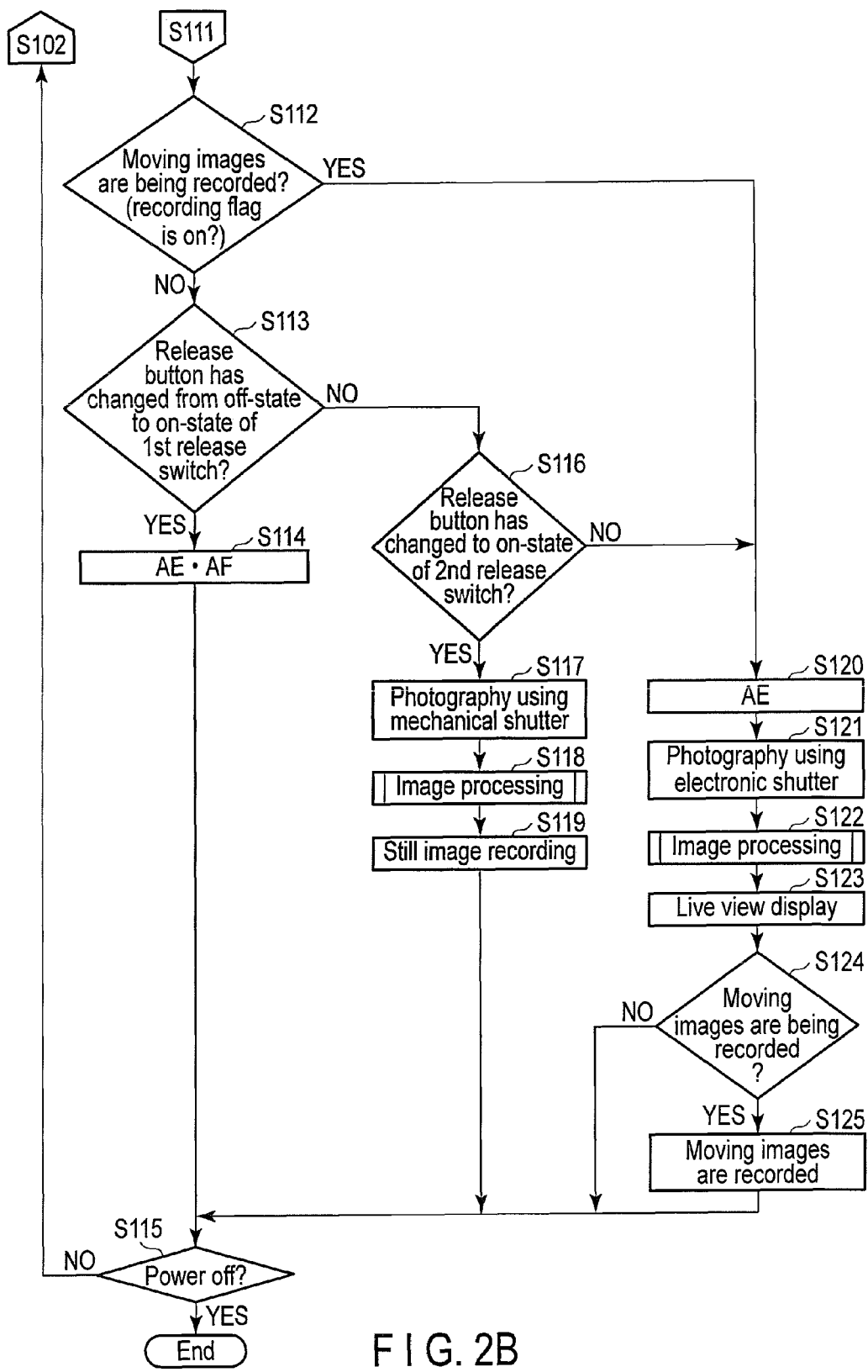

The operation of the above digital camera is described below. FIGS. 2A and 2B are flowcharts showing the main operation of the digital camera according to the present embodiment. The operation in FIGS. 2A and 2B is performed, for example, when the power of the digital camera 1 is turned on. After the power is turned on, the microcomputer 234 performs initialization processing (step S101). In the initialization processing, the microcomputer 234 performs processing to turn off a recording flag set in its register. The recording flag is a flag that indicates whether moving images are being recorded. The recording flag that is turned off indicates that moving images are not being recorded. On the other hand, the recording flag that is turned on indicates that moving images are being recorded.

The microcomputer 234 then determines whether the reproduction button of the operating unit 236 has been pressed by the user (step S102). When it is determined in step S102 that the reproduction button has been pressed, the microcomputer 234 performs reproduction processing (step S103). The reproduction processing will be described in detail later.

When it is determined in step S102 that the reproduction button has not been pressed, the microcomputer 234 determines whether to perform camera setting (step S104). For example, when the menu button of the operating unit 236 is pressed by the user, the microcomputer 234 determines to perform the camera setting. When it is determined in step S104 to perform the camera setting, the microcomputer 234 controls the display driver 224 to cause the display unit 226 to display the menu screen, and then performs camera setting processing (step S105). In the camera setting processing, the microcomputer 234 waits for an instruction from the user to change the camera settings. When instructed to make some changes to the camera settings, the microcomputer 234 changes the appropriate camera setting. In this camera setting processing, changes are made in the settings regarding the finish of the image; for example, the setting of the recording format of the image during still image photography or moving image photography, the white balance (WB) mode, contrast setting, the setting of the degree of edge enhancement (sharpness), and the setting of luminance characteristic changes (gamma setting). In addition, the special image processing mode, for example, the effect may also be set in the camera setting processing.

When it is determined in step S104 not to perform the camera setting, the microcomputer 234 determines whether the moving image button of the operating unit 236 has been pressed by the user (step S106). When it is determined in step S106 that the moving image button has been pressed, the microcomputer 234 toggles the recording flag (step S107). That is, the microcomputer 234 turns on the recording flag that is off, and turns off the recording flag that is on. The microcomputer 234 then determines whether moving images are being recorded at present, that is, whether the recording flag is on (step S108).

When it is determined in step S108 that the recording flag is on, the microcomputer 234 creates a moving image file, and prepares for moving image data to be recorded (step S109). When it is determined in step S108 that the recording flag is not on, the microcomputer 234 closes the moving image file (step S110).

In case of being determined in step S106 that the moving image button has not been pressed, after being closed the moving image file in step S110, or after the creation of the moving image file in step S109, the microcomputer 234 performs effect setting processing (step S111). The effect setting processing will be described in detail later.

After the effect setting processing, the microcomputer 234 again determines whether moving images are being recorded at present, that is, whether the recording flag is on (step S112). When it is determined in step S112 that the recording flag is off, the microcomputer 234 determines whether the release button of the operating unit 236 has been pressed halfway by the user so that the state of the release button has changed from the off-state to the on-state of the 1st release switch (step S113).

When it is determined in step S113 that the state of the release button has changed to the on-state of the 1st release switch, the microcomputer 234 performs the AE processing and the AF processing (step S114). In the AE processing, the microcomputer 234 causes the AE processing unit 216 to calculate subject luminance. The microcomputer 234 then decides a shutter speed (Tv value), an aperture value (Av value), and the ISO during still image photography in accordance with the subject luminance calculated by the AE processing unit 216. Here, the shutter speed, the aperture value, and the ISO may be decided so that the luminance of the subject detected by the subject detecting unit 222 will be proper. In the AF processing, the microcomputer 234 causes the AF processing unit 218 to acquire an AF evaluation value. The microcomputer 234 then evaluates contrast by the AF evaluation value acquired by the AF processing unit 218, and at the same time instructs the microcomputer 108 to drive the focus lens of the lens 102 by a slight amount. The microcomputer 234 then instructs the microcomputer 108 to stop the driving of the focus lens at the point where the contrast is maximized. This AF processing is what is known as contrast-type AF processing. Phase difference AF processing may also be used as the AF processing. The subject detected by the subject detecting unit 222 may be focused.

After the AE processing and the AF processing, the microcomputer 234 determines whether the power of the digital camera 1 has been turned off (step S115). When it is determined in step S115 that the power of the digital camera 1 has not been turned off, the microcomputer 234 performs processing in and after step S102. On the other hand, when it is determined in step S115 that the power of the digital camera has been turned off, the microcomputer 234 finishes the processing in FIGS. 2A and 2B.

When it is determined in step S113 that the state of the release button has not changed to the on-state of the 1st release switch, the microcomputer 234 determines whether the release button of the operating unit 236 has been fully pressed by the user so that the state of the release button has changed to the on-state of the 2nd release switch (step S116).

When it is determined in step S116 that the state of the release button is the on-state of the 2nd release switch, the microcomputer 234 performs photography processing using the mechanical shutter 202 (step S117). Accordingly, the microcomputer 234 sets a gain control amount (amplification factor) in the analog processing unit 206 in accordance with the ISO decided in the AE processing, and sends an F-value decided in the AE processing to the microcomputer 108. The microcomputer 234 then actuates the mechanical shutter 202 in accordance with the exposure time decided in the AE processing to control the exposure of the image pickup device 204 synchronously with the driving of the diaphragm 104 controlled by the microcomputer 108. The RAW data is stored in the SDRAM 214 by this photography processing.

After having performed the photography processing using the mechanical shutter 202, the microcomputer 234 causes the image processing unit 220 to perform image processing for the RAW data which has been stored in the SDRAM 214 by the photography processing (step S118). The image processing will be described in detail later.

After the image processing, the microcomputer 234 performs processing to record the image data stored as the result of the image processing in the SDRAM 214, as a still image file in a set still image recording format (step S119). At the same time, the microcomputer 234 inputs the image data stored in the SDRAM 214 to the image compressing/decompressing unit 228 to instruct the image compressing/decompressing unit 228 to perform still image compressing processing. In response to this instruction, the image compressing/decompressing unit 228 performs the still image compressing processing in accordance with the preset recording mode, and stores the compressed image data in the SDRAM 214. The microcomputer 234 then reads the image data compressed by the image compressing/decompressing unit 228 from the SCRAM 214, creates a still image file from the read image data, and records the created still image file in the recording medium 232.

When it is determined in step S116 that the state of the release button is not the on-state of the 2nd release switch, the microcomputer 234 performs the AF processing (step S120). This AE processing is processing for moving image photography or live view display. After the AE processing, the microcomputer 234 performs photography processing using the electronic shutter (step S121). In this photography processing, the microcomputer 234 actuates the electronic shutter function of the image pickup device 204 in accordance with the exposure time decided in the AE processing to control the exposure of the image pickup device 204. The RAW data is stored in the SDRAM 214 by this photography processing.

After having performed the photography processing using the electronic shutter, the microcomputer 234 causes the image processing unit 220 to perform image processing for the RAW data which has been stored in the SDRAM 214 by the photography processing (step S122). The image processing will be described in detail later.

After the image processing, the microcomputer 234 performs the live view display (step S123). In the live view display, the microcomputer 234 inputs the image data stored in the SDRAM 214 to the display driver 224 as the result of the image processing. Accordingly, the display driver 224 converts the input image data to a video signal, and then outputs the video signal to the display unit 226. The display unit 226 displays an image based on this video signal. This live view display allows the user to, for example, check the composition using the display unit 226.

After the live view display, the microcomputer 234 determines whether moving images are being recorded at present, that is, the recording flag is on (step S124). When it is determined in step S124 that the recording flag is on, the microcomputer 234 skips the processing in step S125. When it is determined in step S124 that the recording flag is on, the microcomputer 234 performs processing to record the image data stored as the result of the image processing in the SDRAM 214, as a moving image file in a set moving image recording format (step S125). At the same time, the microcomputer 234 inputs the moving image data stored in the SDRAM 214 to the image compressing/decompressing unit 228 to instruct the image compressing/decompressing unit 228 to perform moving image compressing processing. In response to this instruction, the image compressing/decompressing unit 228 performs the moving image compressing processing in accordance with the preset recording mode, and stores the compressed image data in the SDRAM 214. The microcomputer 234 then reads the moving image data compressed by the image compressing/decompressing unit 228 from the SDRAM 214, and additionally records the read moving image data in the previously created moving image file. When the recording of the moving image data has finished, information such as the number of frames is recorded in a header recording portion of the moving image file.

FIG. 3 is a flowchart showing the effect setting processing. In the effect setting processing, the user sets the contents of an effect applied to the image (still image or moving image or live view). In accordance with the setting of this effect, the effect is applied to the image during the special image processing described later.

In FIG. 3, the microcomputer 234 determines whether the user has instructed to apply a film noise effect to the image (step S201). The user instructs to apply the film noise effect on a menu screen similar to that in, for example, the camera setting processing. When it is determined in step S201 that the user has not instructed to apply the film noise effect, the microcomputer 234 skips the processing in step S202. When it is determined in step S201 that the user has instructed to apply the film noise effect, the microcomputer 234 sets the image processing unit 220 (special image processing unit 2202) to apply the film noise effect (step S202).

The microcomputer 234 then determines whether the user has instructed to apply a shading effect to the image (step S203). When it is determined in step S203 that the user has not instructed to apply the shading effect, the microcomputer 234 skips the processing in step S204. When it is determined in step S203 that the user has instructed to apply the shading effect, the microcomputer 234 sets the image processing unit 220 (special image processing unit 2202) to apply the shading effect during the special image processing (step S204).

The microcomputer 234 then determines whether the user has instructed to apply a granular noise effect to the image (step S205). When it is determined in step S205 that the user has not instructed to apply the granular noise effect, the microcomputer 234 skips the processing in step S206. When it is determined in step S205 that the user has instructed to apply the granular noise effect, the microcomputer 234 sets the image processing unit 220 (special image processing unit 2202) to apply the granular noise effect during the special image processing (step S206). The microcomputer 234 then finishes the processing in FIG. 3.

FIG. 4 is a flowchart showing the image processing. When the image processing is started, the basic image processing unit 2201 subjects the RAW data stored in the SDRAM 214 to the basic image processing (step S301). The special image processing unit 2202 then subjects the image data (YC data) stored in the SDRAM 214 as the result of the basic image processing to the special image processing (step S302). Thus, the image processing is finished. The basic image processing and the special image processing will be described in detail below.

Figure 5:
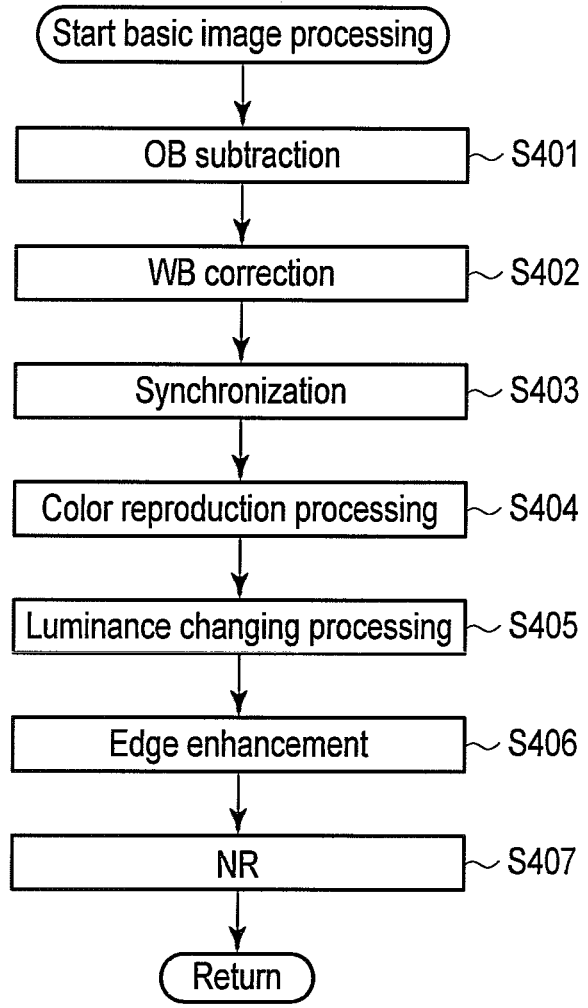
FIG. 5 is a flowchart showing basic image processing.

FIG. 5 is a flowchart showing the basic image processing. After the start of the basic image processing, the basic image processing unit 2201 performs OB subtraction processing (step S401). In the OB subtraction processing, the basic image processing unit 2201 subtracts an optical black (OB) value from the input RAW data to remove the dark current component in the RAW data.

After the OB subtraction processing, the basic image processing unit 2201 performs the WB correction processing (step S402). In the WB correction processing, the basic image processing unit 2201 multiplies the RAW data subjected to the OB subtraction processing by a WB gain corresponding to a WB mode preset by the user, and thereby corrects the color balance of the image. When the user has set an automatic WB mode, the basic image processing unit 2201 analyzes the photographed RAW data, and then multiplies the RAW data by a WB gain corresponding to an estimated light source.

After the WB correction processing, the basic image processing unit 2201 performs the synchronization processing when the format of the RAW data is the Bayer arrangement (step S403). In the synchronization processing, the basic image processing unit 2201 uses the interpolation processing to synchronize the WB-corrected RAW data. In this way, the RAW data in which one pixel has one color component of RGB is converted to RGB data in which one pixel has three color components of RGB.

After the synchronization processing, the basic image processing unit 2201 performs the color reproduction processing (step S404). In the color reproduction processing, the basic image processing unit 2201 multiplies each pixel of the RGB data by the color matrix coefficient corresponding to the set. WB mode, and thereby performs the color conversion of the RGB data. Further, the basic image processing unit 2201 corrects the color so that the hue and saturation of the color-converted RGB data will be appropriate, thereby adjusting the color reproduction of the image.

After the color reproduction processing, the basic image processing unit 2201 performs the luminance changing processing (step S405). In the luminance changing processing, the basic image processing unit 2201 gamma-converts the RGB data subjected to the color reproduction processing, and further converts the gamma-converted RGB data to YC (luminance and color difference) data, and then gamma-converts the Y data. Only one of the RGB and the Y data may be gamma-converted.

After the luminance changing processing, the basic image processing unit 2201 performs the edge enhancement processing (step S406). In the edge enhancement processing, the basic image processing unit 2201 subjects the Y data after the luminance changing processing to band pass filter processing to extract an edge signal, and multiplies the extracted edge signal by a coefficient corresponding to an edge enhancement amount. The basic image processing unit 2201 then adds the edge component multiplied by the coefficient to the original Y data to enhance the edge component in the image.

After the edge enhancement processing, the basic image processing unit 2201 performs the noise reduction (NR) processing (step S407). The basic image processing unit 2201 then finishes the processing in FIG. 5. In the noise reduction processing, the basic image processing unit 2201 frequency-separates the Y data subjected to the edge enhancement processing, and reduces the noise component in the image by, for example, coring processing in accordance with the frequency. The noise component may be reduced in Cb data or Cr data. The data after the noise reduction processing is again converted to the RGB format by a predetermined matrix operation when the recording format is the TIFF format.

FIG. 6 is a flowchart showing the special image processing. FIG. 6 shows an example in which the processing to apply the film noise effect, the processing to apply the shading effect, and the processing to apply the granular noise effect are performed as the special image processing. In the special image processing, the special image processing other than the processing shown in FIG. 6, for example, blurring processing may be additionally performed.

In FIG. 6, the special image processing unit 2202 determines whether the film noise effect is set to be applied (step S501). When it is determined in step S501 that the film noise effect is not set to be applied, the special image processing unit 2202 skips the processing in step S502. When it is determined in step S501 that the film noise effect is set to be applied, the special image processing unit 2202 performs processing to apply the film noise effect to the image data (YC data) (step S502). This processing will be described in detail later.

The special image processing unit 2202 then determines whether the shading effect is set to be applied (step S503). When it is determined in step S503 that the shading effect is not set to be applied, the special image processing unit 2202 skips the processing in step S502. When it is determined in step S503 that the shading effect is set to be applied, the special image processing unit 2202 performs processing to apply the shading effect to the image data (YC data) (step S504). This processing will be described in detail later.

The special image processing unit 2202 then determines whether the granular noise effect is set to be applied (step S505). When it is determined in step S505 that the granular noise effect is not set to be applied, the special image processing unit 2202 skips the processing in step S506 and then finishes the processing in FIG. 6. When it is determined in step S505 that the granular noise effect is set to be applied, the special image processing unit 2202 performs processing to apply the granular noise effect to the image data (YC data) (step S506). The special image processing unit 2202 then finishes the processing in FIG. 6. This processing to apply the granular noise effect will be described in detail later.

Figure 7:
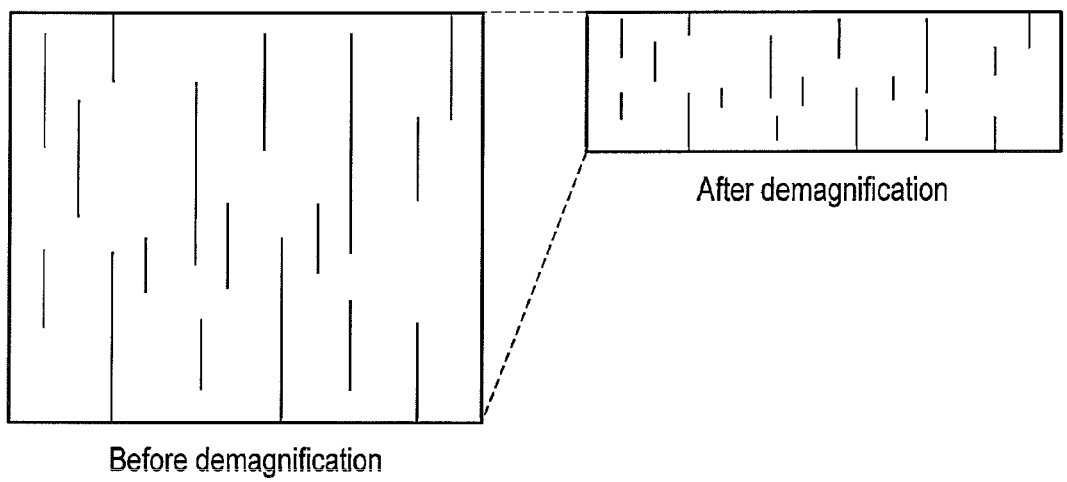
FIG. 7 is a diagram showing scratch image data.
Figure 8:
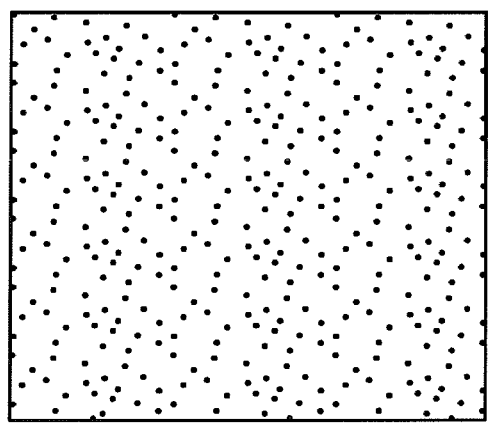
FIG. 8 is a diagram showing noise image data.
Figure 9:
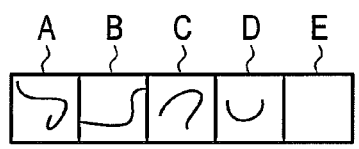
FIG. 9 is a diagram showing dust image data.

Now, the processing to apply the film noise effect is described. Before the detailed description of the processing to apply the film noise effect, the scratch image data, the noise image data, and the dust image data are described. FIG. 7 is a diagram showing the scratch image data. FIG. 8 is a diagram showing the noise image data. FIG. 9 is a diagram showing the dust image data. The scratch image data, the noise image data, and the dust image data are image data in which a specific noise that can be generated during film photography is patterned. The sizes of the scratch image data, the noise image data, and the dust image data are decided based on the image data of a predetermined size (e.g., 1980×1080 pixels).

As shown in FIG. 7, the scratch image data is composed of randomly arranged longitudinal streak patterns different in length. When the scratch image data having the arrangement of longitudinal streak patterns is superimposed on the image data (YC data), noise resulting from scratches produced when the film is longitudinally moved is reproduced on the image data. Here, lateral streak patterns may be arranged instead of the patterns in FIG. 7. When the scratch image data having the arrangement of lateral streak patterns is superimposed on the image data (YC data), noise resulting from scratches produced when the film is laterally moved is reproduced on the image data.

The scratch image data is image data having a high correlation in a direction (longitudinal direction in FIG. 7) along the streak patterns. Thus, the scratch image data is demagnified (e.g., to about ⅛ to ⅙ when the size of the scratch image data is decided based on the image data having 1980×1080 pixels) in a direction of the high correlation (longitudinal direction in FIG. 7), and scratch image data obtained by the magnification of this demagnified scratch image data is highly correlated with the original scratch image data which is not demagnified. That is, even the scratch image data that is demagnified can be used without any problem if it is magnified later. Thus, it is preferable that the demagnified scratch image data is stored in the flash memory 238. If the demagnified scratch image data is stored in the flash memory 238, the capacity of the flash memory 238 can be saved. If processing is performed by use of the demagnified scratch image data before actual superposition, the band of the SDRAM 214 can also be saved.

As shown in FIG. 8, the noise image data is composed of randomly and two-dimensionally arranged granular patterns. When the noise image data is superimposed on the image data (YC data), noise resulting from, for example, dust produced at a film developing stage in film photography is reproduced on the image data. The granular patterns in the noise image data are randomly arranged in both the longitudinal and lateral directions. Therefore, in contrast to the scratch image data, the noise image data is not image data that is correlated in a particular direction. Thus, it is preferable that the noise image data that is not demagnified is stored in the flash memory 238. However, when the noise image data needs to be demagnified because of the relation with the capacity of the flash memory 238 and the band of the SDRAM 214, it is preferable to demagnify the noise image data at the same magnification factor in the longitudinal direction and the lateral direction.

As shown in FIG. 9, the dust image data is image data in which noise caused by filiform dust is patterned. In the example of FIG. 9, the dust image data includes five patterns of image data: image data A to D regarding four different patterns of dust, and image data E without dust. One of the five patterns of image data is randomly selected and superimposed on the image data (YC data). When the dust image data is superimposed on the image data (YC data), noise resulting from dust adhering to the film surface during film photography is reproduced on the image data. Here, FIG. 9 shows the example in which the dust image data has five patterns of image data. The number of patterns stored as the dust image data is not exclusively five.

Figure 10:
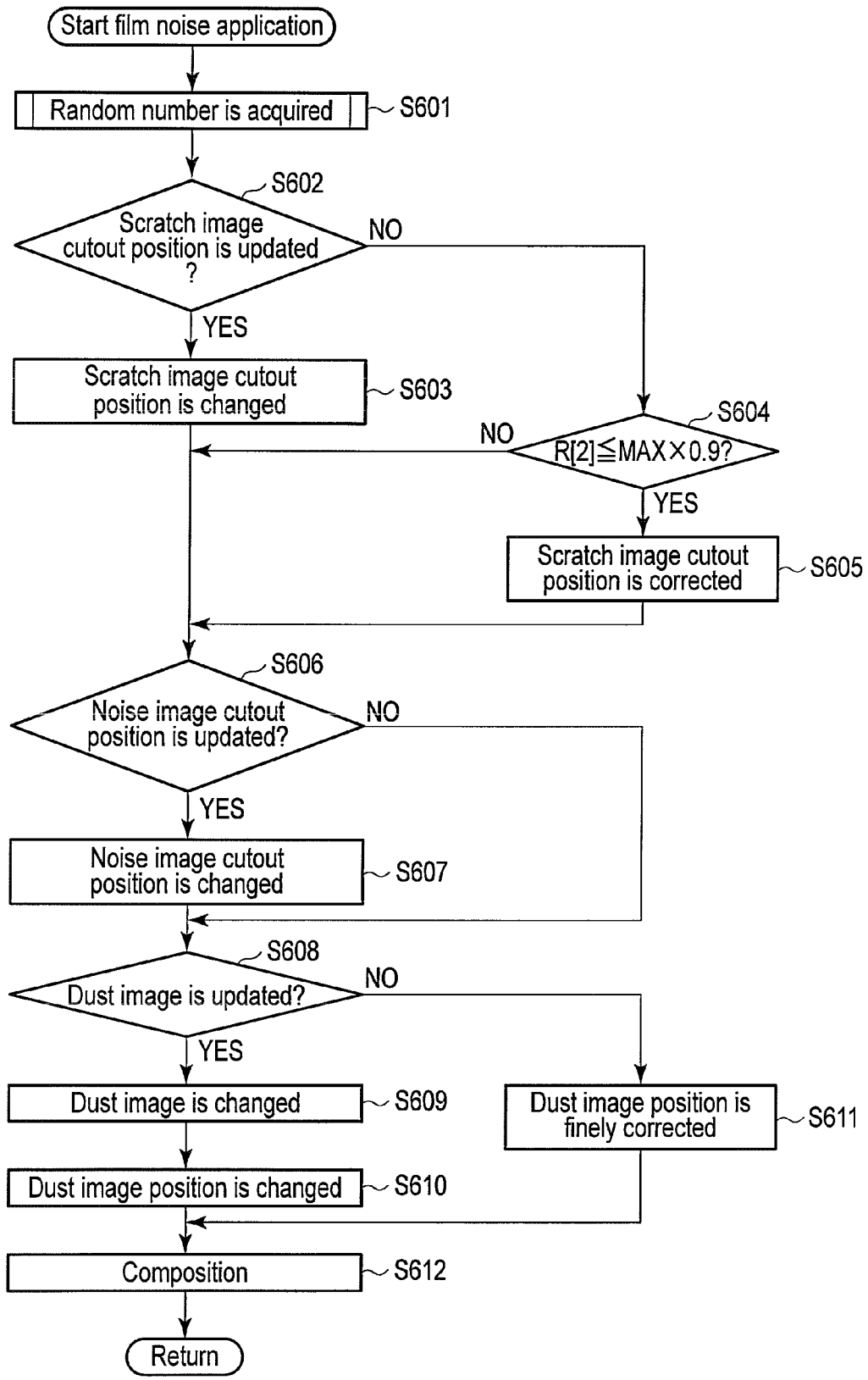
FIG. 10 is a flowchart showing processing to apply a film noise effect.

FIG. 10 is a flowchart showing processing to apply the film noise effect. In FIG. 10, the special image processing unit 2202 causes the random seed generating unit 2202a and the pseudo-random number generating unit 2202b to acquire a pseudo-random number necessary to apply the film noise (step S601). In the processing shown in FIG. 10, ten pseudo-random numbers (R[0] to R[9]) are acquired by way of example. Here, the pseudo-random numbers R[0] to R[9] have values ranging from 0 to a random number maximum value MAX. The specific way to acquire the pseudo-random numbers R[0] to R[9] will be described later.

After having acquired the pseudo-random numbers R[0] to R[9], the special image processing unit 2202 determines whether to greatly (randomly) update the cutout position of the scratch image data to be superposed on the image data (YC data) (step S602). Here, the cutout position is a referential position to decide a cutout range of the scratch image data, and corresponds to upper left coordinates of the scratch image data. In the present embodiment, the cutout range of the scratch image data is randomly updated at the time of the superposition of the scratch image data to reproduce the randomness of the noise resulting from the scratches. In step S602, when the image data to which the film noise effect is to be applied is still image data, the determination is always Yes. When the image data to which the film noise effect is to be applied is not still image data (e.g., the image data is moving image data or image data for the live view display), the determination corresponding to the initial frame is Yes, and the determinations corresponding to the subsequent frames are randomly Yes. For example, when the pseudo-random number R[0] is equal to or higher than the threshold which varies depending on the number of frames after the update of the cutout position, the determination is Yes.

Figure 11:
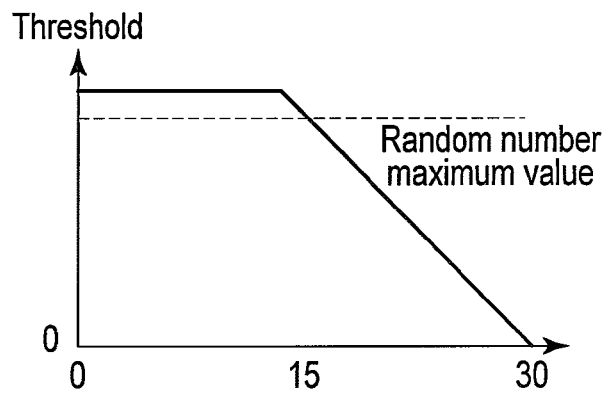
FIG. 11 is a graph showing an example of the relation of a threshold used in a determination in step S602 with the number of frames.

FIG. 11 is a graph showing an example of the relation of the threshold used in the determination in step S602 with the number of frames. The horizontal axis in FIG. 11 indicates the number of lapsed frames when the frame in which the cutout position has been updated is 0. The vertical axis in FIG. 11 indicates the value of the threshold. In the example of FIG. 11, the threshold is higher than the maximum value of the pseudo-random number R[0] between the 0th frame and the 14th frame. Therefore, the determination is always No in step S602 up to the 14th frame after the update. From the 15th frame to 29th frame, whether the determination is Yes or No depends on the value of the pseudo-random number R[0]. That is, from the 15th frame to 29th frame after the update, whether to update the cutout position is randomly decided. In the 30th frame, the threshold reaches the maximum value (0 in the example shown) of the pseudo-random number R[0]. Therefore, when there is no update in 30 frames after the update, the determination is always Yes in step S602. When the scratch is flowing streak noise, the user is less uncomfortable. Accordingly, as shown in FIG. 11, while the cutout position of the scratch image data is not updated frequently, the cutout position is changed at times. In this way, noise similar to the noise resulting from the actual scratch is reproduced on the image data. Here, the relation in FIG. 11 is illustrative only and can be suitably changed.

When it is determined in step S602 to update the cutout position, the special image processing unit 2202 causes the cutout position calculating unit 2202c to update the cutout position of the scratch image data (step S603). For example, the X coordinates on the upper left side of the cutout position are updated to the position indicated by the pseudo-random number R[1], and the Y coordinates on the upper left side of the cutout position are updated to the position indicated by the pseudo-random number R[2]. Here, the minimum value of the pseudo-random number R[1] corresponds to, for example, the coordinates on the upper left side of the cutout range in which the left end of the cutout range contacts the left end of the scratch image data, and the maximum value of the pseudo-random number R[1] corresponds to, for example, the coordinates on the upper left side of the cutout range in which the right end of the cutout range contacts the right end of the scratch image data. The minimum value of the pseudo-random number R[2] corresponds to, for example, the coordinates on the upper left side of the cutout range in which the upper end of the cutout range contacts the upper end of the scratch image data, and the maximum value of the pseudo-random number R[2] corresponds to, for example, the coordinates on the upper left side of the cutout range in which the lower end of the cutout range contacts the lower end of the scratch image data. Moreover, regarding the sizes of the cutout range of the scratch image data, for example, the longitudinal size is the demagnification factor of the image data to be composed, and the lateral size is the same size as that of the image data to be composed.

Figure 12A:
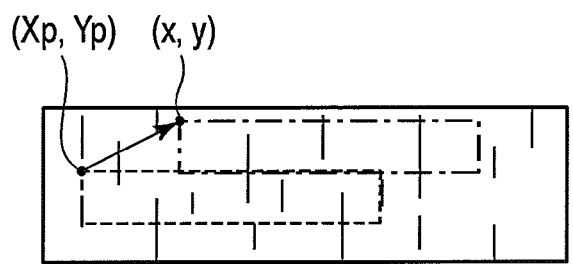
FIG. 12A is a diagram showing an overview of the update of a cutout position of the scratch image data.

FIG. 12A shows an overview of the update of the cutout position. A dashed frame in FIG. 12A indicates the cutout range before update, and a dashed-dotted frame in FIG. 12A indicates the cutout range after update. The cutout position is updated by updating the cutout position (Xp, Yp) before update to the cutout position (x, y) after update, as shown in FIG. 12A. x and y are provided by, for example, (Equation 1):

$$x = R[1] \div MAX \times (Xmax - Xmin) + Xmin$$

$$y = R[2] \div MAX \times (Ymax - Ymin) + Ymin \quad \text{(Equation 1)}$$

wherein Xmax indicates the maximum value in the lateral direction, Xmin indicates the minimum value in the lateral direction, Ymax indicates the maximum value in the longitudinal direction, and Ymin indicates the minimum value in the longitudinal direction.

Figure 12B:
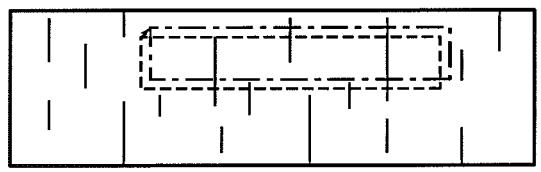
FIG. 12B is a diagram showing an overview of a fine correction of the cutout position of the scratch image data.
Figure 12C:
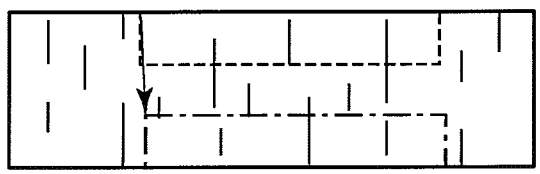
FIG. 12C is a diagram showing an overview of the correction of the cutout position of the scratch image data after the cutout position has reached an upper end.

When it is determined in step S602 not to update the cutout position, the special image processing unit 2202 determines whether the pseudo-random number R[2] (i.e., the Y coordinates of the cutout position) is equal to or lower than the random number maximum value MAX×0.9 (step S604). When it is determined in step S604 that the pseudo-random number R[2] is equal to or lower than the random number maximum value MAX×0.9, the special image processing unit 2202 finely corrects the cutout position of the scratch image data (step S605). The cutout position is finely corrected so that the distance between the cutout position before update and the cutout position after update does not increase, that is, corrected within the limited range near the cutout position before update, as shown in FIG. 12B. In this case, the cutout position is upwardly changed at regular intervals in the longitudinal direction, and randomly changed in the lateral direction. In the longitudinal direction, the cutout position is corrected toward the lower end as shown in FIG. 12C in the next correction when the cutout position has reached the upper end. The corrected cutout position (x, y) in the case of the above correction is provided by, for example, (Equation 2):

$$x = Xp + ((R[1] - MAX/2)/MAX) \times J$$

$$y = Yp - K \quad \text{(Equation 2)}$$

wherein J is a lateral basic movement speed (pixel/frame) of the streak pattern decided at the time of designing. For example, J is 5. K is a longitudinal movement speed (pixel/frame) of the streak pattern which is decided at the time of designing. For example, K is 10. When x is lower than the minimum value in the lateral direction as a result of the calculation in (Equation 2), x is clipped to the minimum value in the lateral direction. In contrast, when x is higher than the maximum value in the lateral direction as a result of the calculation in (Equation 2), x is clipped to the maximum value in the lateral direction. When y is equal to or lower than the minimum value in the longitudinal direction as a result of calculation in (Equation 2), that is, when the cutout position has reached the upper end, y is corrected to the maximum value (i.e., the lower end position) in the longitudinal direction in the next frame. The X coordinates of the cutout position are randomly changed by (Equation 2) per frame within the range of five pixels (Xp±2.5 pixels). The Y coordinates of the cutout position are upwardly changed by ten pixels per frame. When it is determined in step S604 that the pseudo-random number R[2] is not equal to or lower than the random number maximum value MAX×0.9, the special image processing unit 2202 skips the processing in step S605 and then shifts the processing to step S606. The condition for skipping the processing in step S605 may be a threshold other than the above-mentioned threshold. Alternatively, the processing in step S605 may not be skipped at all times.

The special image processing unit 2202 then determines whether to update the cutout position of the noise image data to be superposed on the image data (YC data) (step S606). In the present embodiment, the cutout range of the noise image data is randomly updated at the time of the superposition of the noise image data to reproduce the randomness of the noise resulting from, for example, dust. This determination of whether to update the cutout position is the determination in step S606. In step S606, when the image data to which the film noise effect is to be applied is still image data, the determination is always Yes. When the image data to which the film noise effect is to be applied is not still image data, the determination corresponding to the initial frame is Yes, and the determinations corresponding to the subsequent frames are randomly Yes. For example, when the pseudo-random number R[3] is equal to or higher than the threshold which varies depending on the number of frames after the update of the cutout position, the determination is Yes.

Figure 13:
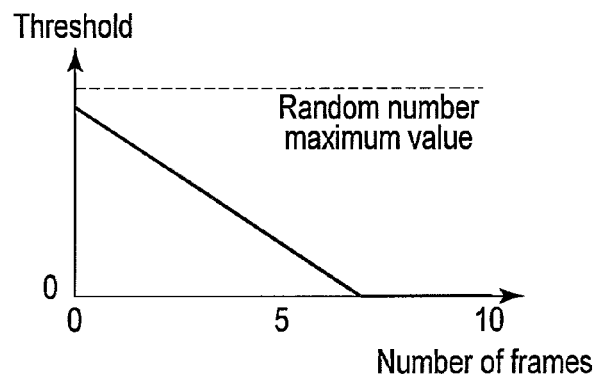
FIG. 13 is a graph showing an example of the relation between the number of frames and the threshold for making a determination in step S606.

FIG. 13 is a graph showing an example of the relation between the number of frames and the threshold for making a determination in step S606. The horizontal axis in FIG. 13 indicates the number of lapsed frames when the frame in which the cutout position has been updated is 0. The vertical axis in FIG. 13 indicates the value of the threshold. In the example of FIG. 13, the threshold falls between the 0-th frame and the predetermined frame (the 7-th frame in the example shown). The threshold is the minimum value (0 in the example shown) of the pseudo-random number R[3] between the predetermined frame and the 10th frame. Therefore, the determination is always Yes in step S606 when there is no update for the predetermined frames after the update. In contrast to FIG. 11, there is no period in which the threshold is higher than the random number maximum value in FIG. 13. Therefore, the cutout position of the noise image data is frequently updated as compared to the scratch image data. Here, the relation in FIG. 13 is illustrative only and can be suitably changed.

When it is determined in step S606 not to update the cutout position, the special image processing unit 2202 skips the processing in step S607. When it is determined in step S606 to update the cutout position, the special image processing unit 2202 causes the cutout position calculating unit 2202c to update the cutout position of the noise image data (step S607). For example, the X coordinates on the upper left side of the cutout position are updated to the position indicated by the pseudo-random number R[4], and the Y coordinates on the upper left side of the cutout position are updated to the position indicated by the pseudo-random number R[5]. Here, the minimum value of the pseudo-random number R[4] corresponds to, for example, the coordinates on the upper left side of the cutout range in which the left end of the cutout range contacts the left end of the noise image data, and the maximum value of the pseudo-random number R[4] corresponds to, for example, the coordinates on the upper left side of the cutout range in which the right end of the cutout range contacts the right end of the noise image data. The minimum value of the pseudo-random number R[5] corresponds to, for example, the coordinates on the upper left side of the cutout range in which the upper end of the cutout range contacts the upper end of the noise image data, and the maximum value of the pseudo-random number R[5] corresponds to, for example, the coordinates on the upper left side of the cutout range in which the lower end of the cutout range contacts the lower end of the noise image data. Moreover, the cutout range of the noise image data is the same size as, for example, the image data to be composed.

Figure 14:
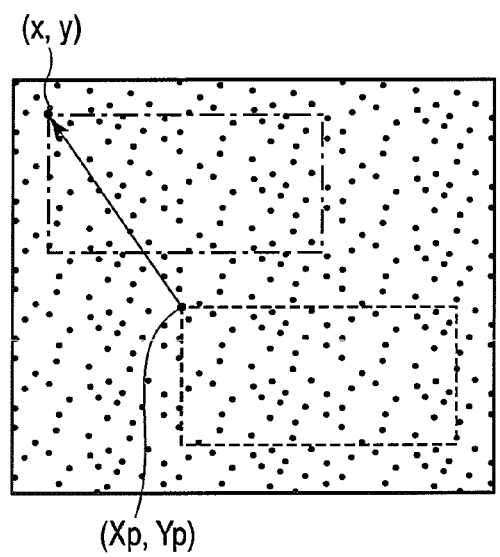
FIG. 14 is a diagram showing an overview of the update of a cutout position of the noise image data.

FIG. 14 shows an overview of the update of the cutout position. A dashed frame in FIG. 14 indicates the cutout range before update, and a dashed-dotted frame in FIG. 14 indicates the cutout range after update. The cutout position of the noise image data is updated by updating the cutout position (Xp, Yp) before update to the cutout position (x, y) after update, as in the case of the scratch image data. x and y are provided by, for example, (Equation 3):

$$x = R[4] \div MAX \times (X\max - X\min) + X\min$$

$$y = R[5] \div MAX \times (Y\max - Y\min) + Y\min \quad \text{(Equation 3)}$$

The special image processing unit 2202 then determines whether to update the dust image data to be superposed on the image data (YC data) (step S608). In step S608, when the image data to which the film noise effect is to be applied is still image data, the determination is always Yes. When the image data to which the film noise effect is to be applied is not still image data, the determination corresponding to the initial frame is Yes, and the determinations corresponding to the subsequent frames are randomly Yes. For example, when the pseudo-random number R[6] is equal to or higher than the threshold which varies depending on the number of frames after the update of the cutout position, the determination is Yes.

Figure 15:
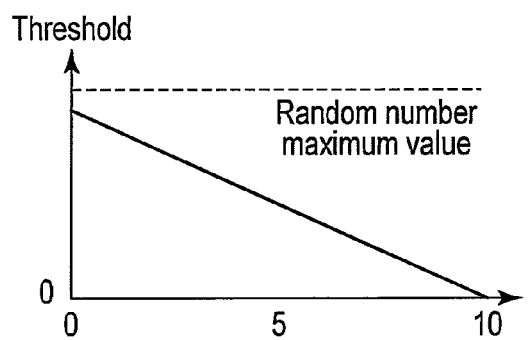
FIG. 15 is a graph showing an example of the relation between the number of frames and the threshold for making a determination in step S608.

FIG. 15 is a graph showing an example of the relation between the number of frames and the threshold for making a determination in step S608. The horizontal axis in FIG. 15 indicates the number of lapsed frames when the frame in which the cutout position has been updated is 0. The vertical axis in FIG. 15 indicates the value of the threshold. In the example of FIG. 15, the threshold linearly falls between the 0th frame and the 10th frame. In this case, the determination is always Yes in step S608 when there is no update before the 10th frame. There is no period in which the threshold is higher than the random number maximum value in FIG. 15 either. Therefore, the cutout position of the dust image data is frequently changed as compared to the scratch image data. Here, the relation in FIG. 15 is illustrative only and can be suitably changed.

When it is determined in step S608 to update the dust image data, the special image processing unit 2202 updates the dust image data (step S609). For example, numbers are given to dust image data A to E shown in FIG. 9. In step S609, the currently selected dust image data is changed to the dust image data (e.g., A if the remainder is 0 when R[7] is divided by 5, B if the remainder is 1, C if the remainder is 2, D if the remainder is 3, and E if the remainder is 4) indicated by the pseudo-random number R[7]. After the update of the dust image data, the special image processing unit 2202 changes the composing position of the dust image data (step S610). For example, the X coordinates on the upper left side of the composing position are updated to the position indicated by the pseudo-random number R[8], and the Y coordinates on the upper left side of the composing position are updated to the position indicated by the pseudo-random number R[9].

Figure 16A:
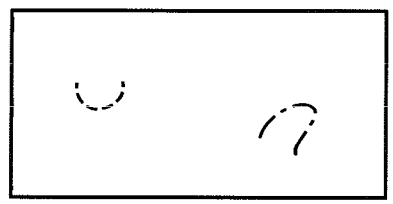
FIG. 16A is a diagram showing an overview of the update of a composing position of the dust image data.

Here, the minimum value of the pseudo-random number R[8] corresponds to, for example, the coordinates of the left end of the image data to be composed, and the maximum value of the pseudo-random number R[8] corresponds to, for example, the coordinates of the right end of the image data to be composed. The minimum value of the pseudo-random number R[9] corresponds to, for example, the coordinates of the upper end of the image data to be composed, and the maximum value of the pseudo-random number R[9] corresponds to, for example, the coordinates of the lower end of the image data to be composed. FIG. 16A shows an overview of the update of the composing position of the dust image data. A dashed line in FIG. 16A indicates the dust image data before update, and a dashed-dotted line in FIG. 16A indicates the dust image data after update. As shown in FIG. 16A, not only the composing position but also the pattern of the dust image data is changed in the case of the dust image data.

Figure 16B:
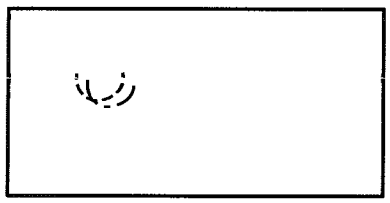
FIG. 16B is a diagram showing an overview of a fine correction of the composing position of the dust image data.

When it is determined in step S608 not to update the dust image data, the special image processing unit 2202 finely corrects the composing position of the dust image data (step S611). The composing position is finely corrected so that the distance between the composing position before update and the composing position after update does not increase, as shown in FIG. 16B. In this case, the composing position is randomly changed in both the longitudinal direction and the lateral direction. The corrected composing position (x, y) is provided by, for example, (Equation 4):

$$x = Xp + ((R[8] - MAX/2)/MAX) \times L$$

$$y = Yp + HR[9] - MAX/2)/MAX) \times M \quad \text{(Equation 4)}$$

wherein L is a lateral basic movement speed (pixel/frame) of the dust image data decided at the time of designing. For example, L is 5. M is a longitudinal movement speed (pixel/frame) of the dust image data decided at the time of designing. For example, M is 5. Moreover, both x and y are values within the range of the lateral direction and the longitudinal direction. Therefore, when x or y is lower than the minimum value in the lateral direction or the longitudinal direction as a result of the calculation in (Equation 4), x or y is clipped to the minimum value in the lateral direction or the longitudinal direction. In contrast, when x or y is higher than the maximum value in the lateral direction or the longitudinal direction as a result of the calculation in (Equation 4), x or y is clipped to the maximum value in the lateral direction or the longitudinal direction.

Figure 17:
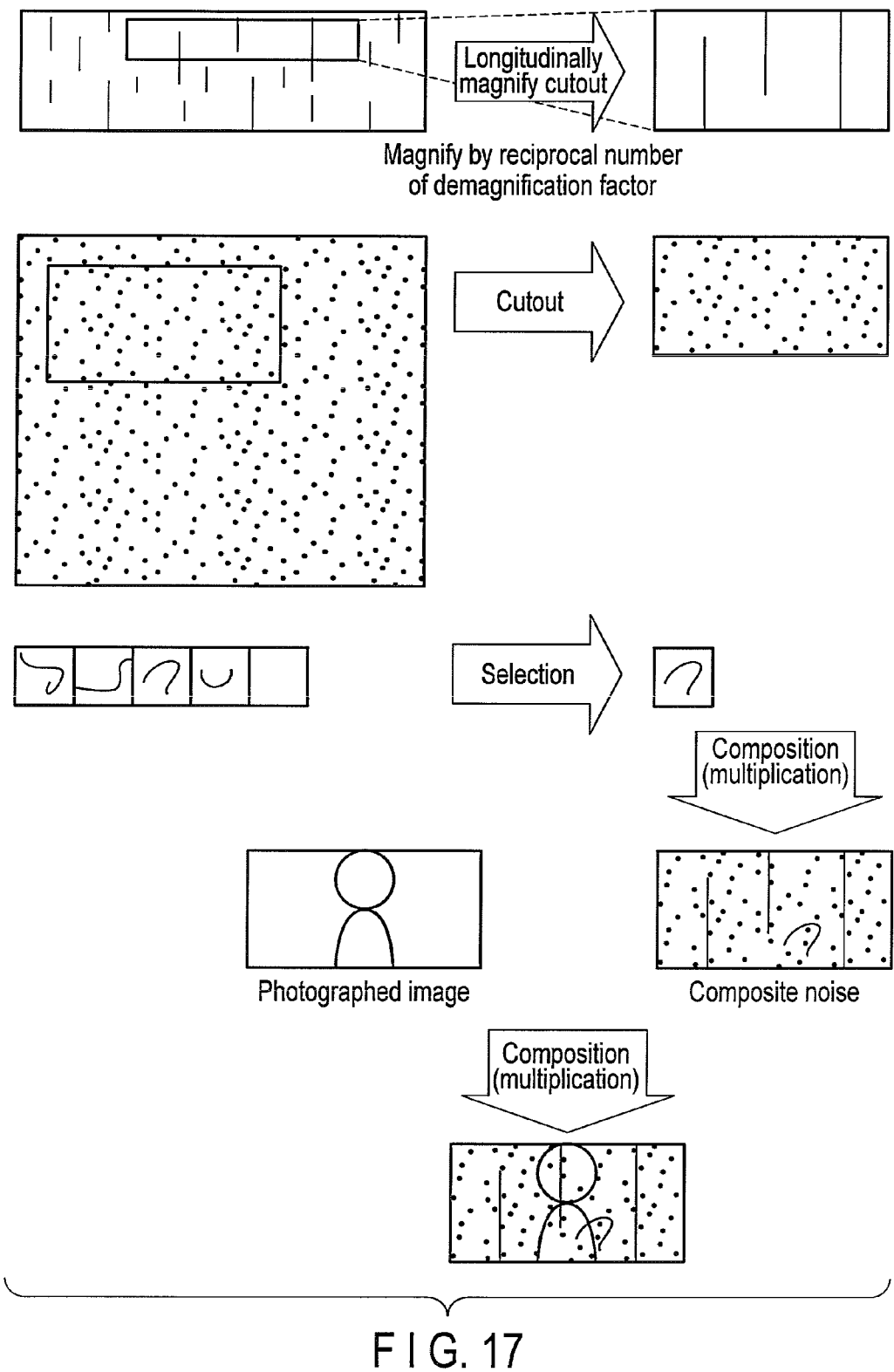
FIG. 17 is a diagram showing an overview of composing processing.

The special image processing unit 2202 then causes the composing unit 2202d to compose the scratch image data, the noise image data, and the dust image data with the image data to be composed (step S612). The special image processing unit 2202 then finishes the processing in FIG. 10. FIG. 17 is a diagram showing an overview of composing processing. In the composition, the size of the scratch image data is first adjusted to the size of the image data to be composed. As described above, the scratch image data is demagnified in the longitudinal direction in which the correlation is high. Therefore, the scratch image data after the cutout is magnified in the longitudinal direction by the reciprocal number of the demagnification factor to adjust the size of the scratch image data to the size of the image data to be composed. After the size of the scratch image data has been adjusted to the size of the image data to be composed, the scratch image data, the noise image data, and the dust image data are composed. The three types of image data are composed; by multiplying by 0 if the value of each pixel is 0 (black), by multiplying by 1.0 if the value of each pixel is the maximum value (white), or by multiplying by a value of 0 to 1.0 depending on the brightness if the value of each pixel is some other value. After composite noise image data has been obtained by the composition of the three image data, the composite noise image data is composed with the image data to be composed. This composition is also performed by, for example, the multiplication of these image data. Here, the composing processing may be performed by some other method. For example, each pixel may be compared, and the value of the darker pixel may be the composition result.

The sizes of the scratch image data, the noise image data, and the dust image data are decided based on the image data of a predetermined size (e.g., 1980×1080 pixels). Therefore, it is preferable to magnify or demagnify and then compose the scratch image data, the noise image data, and the dust image data depending on the size of the image data to be composed. FIG. 18 is a diagram showing an overview of this composing processing. For example, when the size of the image data to be composed is 4000×3000 pixels (e.g., still image data), the noise image data and the dust image data are magnified 4000/1920 times in the longitudinal direction and the lateral direction and then composed. The scratch image data has been demagnified in the longitudinal direction. Therefore, the scratch image data is magnified (1/demagnification factor)× 4000/1920 times and then composed. Thus, the scratch image data, the noise image data, and the dust image data for each size of the image data to be composed do not need to be stored. Here, the size of the image data to be composed is more than 1980×1080 pixels in the example shown in FIG. 18. Even when the size of the image data to be composed is smaller than 1980×1080 pixels, the scratch image data, the noise image data, and the dust image data have only to be demagnified as in the case where the size of the image data to be composed is larger than 1980×1080 pixels. Here, the scratch image data, the noise image data, and the dust image data are resized (magnified) and then composed in FIG. 18. However, these three images may be resized after being composed, and composed with the photographed image.

Figure 19:
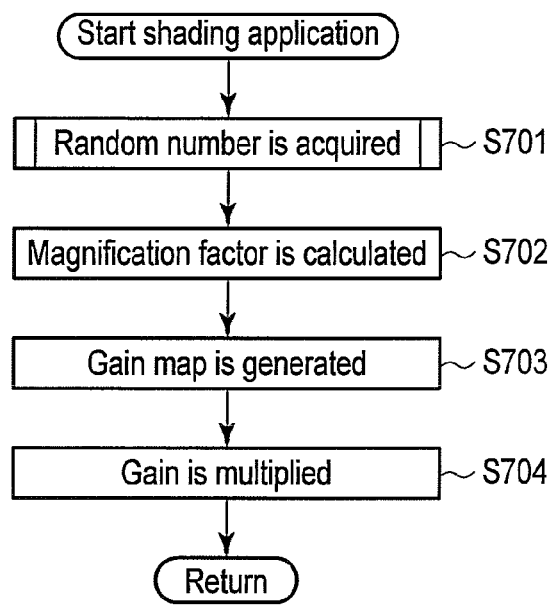
FIG. 19 is a flowchart showing shading processing.

FIG. 19 is a flowchart showing shading processing. In FIG. 19, the special image processing unit 2202 causes the random seed generating unit 2202a and the pseudo-random number generating unit 2202b to acquire a pseudo-random number necessary to apply shading (step S701). In the processing shown in FIG. 19, at least one pseudo-random number R is acquired by way of example. The specific way to acquire the pseudo-random number will be described later.

After having acquired the pseudo-random number R, the special image processing unit 2202 calculates a magnification factor that indicates the shape of shading (step S702). a is provided by, for example, (Equation 5):

$$a = 0.5 + R/MAX \quad \text{(Equation 5)}$$

wherein a is the magnification factor.

After having calculated the magnification factor a, the special image processing unit 2202 generates a gain map in accordance with the magnification factor a (step S703). The gain map is a map having a gain such that the value of luminance gradually decreases with the distance from the pixel at the central position of a region (e.g., a region where the subject exists) to which the shading is applied. The maximum value of the gain is 1. In the present embodiment, the gain map thus generated that is resized by the magnification factor a is used as the final gain map.

Figure 20A:
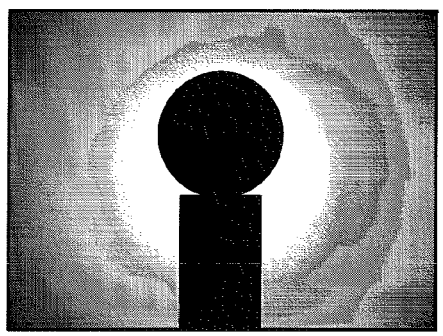
FIG. 20A is a diagram showing an example of a shading effect which is applied when a magnification factor a is 0.5.
Figure 20B:
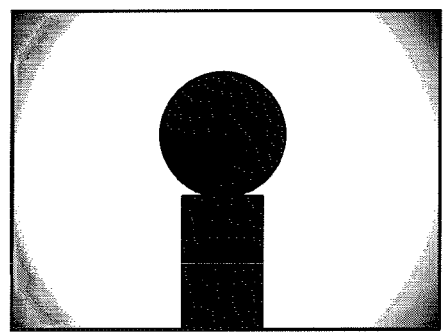
FIG. 20B is a diagram showing an example of a shading effect which is applied when the magnification factor a is 1.5.

After having generated the gain map, the special image processing unit 2202 multiples the gain indicated by the gain map by the corresponding pixel (step S704). In this way, the shading effect such that the periphery of the image data is darker is applied. Here, in the present embodiment, the magnification factor a changes between 0.5 and 1.5 depending on the value of the pseudo-random number R. In accordance with the change of a, the shape (size) of the shading changes. FIG. 20A shows an example of a shading effect which is applied when the magnification factor a is 0.5. FIG. 20B shows an example of a shading effect which is applied when the magnification factor a is 1.5.

Here, the user may feel uncomfortable if the shape of the shading excessively changes. Therefore, the value of the magnification factor may be controlled so that the difference between the magnification factor in the previous shading application processing and the magnification factor in the current shading application processing is within a predetermined range. For example, factor a is decided so that the condition in (Equation 6) is satisfied:

$$|b-a|<0.1 \quad \text{(Equation 6)},$$

wherein b is the magnification factor in the previous shading application processing, and a is the magnification factor in the current shading application processing.

In the example in the flowchart of FIG. 19, the magnification factor a is always changed. This is not a limitation. The magnification factor a may be changed only once in several frames. In this case, for the frame for which the magnification factor a has not been changed, the magnification factor a may be calculated by the linear interpolation between the current frame and the previous frame.

FIG. 21 is a flowchart showing processing to apply the granular noise effect. In FIG. 21, the special image processing unit 2202 causes the random seed generating unit 2202a and the pseudo-random number generating unit 2202b to acquire a pseudo-random number necessary to apply granular noise (step S801). In the processing shown in FIG. 21, at least two pseudo-random numbers Wr and Hr are acquired. The specific way to acquire the pseudo-random numbers will be described later. After having acquired the pseudo-random numbers Wr and Hr, the special image processing unit 2202 reads the noise image data (step S802). The special image processing unit 2202 then calculates a cutout position of the noise image data (step S803). The cutout position is a referential position to decide a cutout range of the noise image data, and corresponds to upper left coordinates of the noise image data. In the present embodiment, the cutout range of the noise image data is randomly updated at the time of the superposition of the noise image data to reproduce the randomness of the noise resulting from the dust. The cutout position (x, y) after update is provided by, for example, (Equation 7):

$$x=(Wn-Wi) \times Wr/\text{MAX}$$

$$y=(Hn-Hi) \times Hr/\text{MAX} \quad \text{(Equation 7)}$$

wherein Wn is the size (the number of pixels) of the image data to be composed in the lateral direction, Hn is the size (the number of pixels) of the image data to be composed in the longitudinal direction, Wi is the size (the number of pixels) of the cutout range in the lateral direction, and Hi is the size (the number of pixels) of the cutout range in the longitudinal direction. FIG. 22 shows the relation between Wn, Hn, Wi, and Hi.

After having calculated the cutout position, the special image processing unit 2202 causes the composing unit 2202d to compose the noise image data with the image data to be composed (step S804). The special image processing unit 2202 then finishes the processing in FIG. 21. The noise image data is composed as in the film noise effect application processing. When necessary, the size of the noise image data is adjusted to the size of the image data to be composed, and these data are multiplied and composed.

Here, the cutout position is always changed in the example in the flowchart of FIG. 21. This is not a limitation. The cutout position may only be changed once in several frames or may be randomly changed. When the cutout position is randomly changed, another pseudo-random number is acquired in step S801. A determination similar to, for example, that in step S606 has only to be then made.

Figure 23:
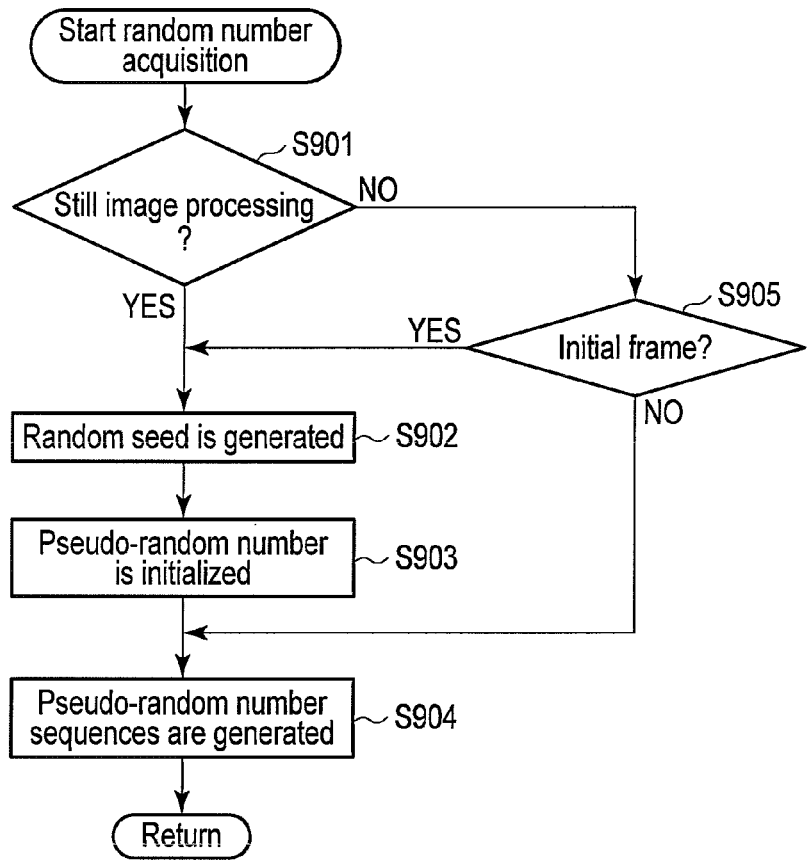
FIG. 23 is a flowchart showing pseudo-random number acquiring processing.

Now, the pseudo-random number acquiring processing is described. FIG. 23 is a flowchart showing the pseudo-random number acquiring processing. In FIG. 23, the special image processing unit 2202 determines whether the current special image processing is the processing for a still image (step S901). Information regarding whether the current special image processing is the processing for a still image is provided by, for example, the microcomputer 234.

In the example described above, the cutout position, for example, is always randomly updated in the special image processing for a still image. Therefore, when it is determined in step S901 that the current special image processing is the processing for a still image, the special image processing unit 2202 causes the random seed generating unit 2202a to generate a random seed (step S902). The random seed is generated in accordance with various parameters associated with the digital camera 1, such as the RAW data, camera settings, and conditions during photography. The specific way to generate the random seed will be described later. After the generation of the random seed, the special image processing unit 2202 initializes the pseudo-random number generator of the pseudo-random number generating unit 2202b (step S903). In this processing, the pseudo-random number generating unit 2202b sets the initial value to be set in the pseudo-random number generator to the value of the random seed generated in step S902. The special image processing unit 2202 then causes the pseudo-random number generating unit 2202b to generate a necessary number of pseudo-random number sequences (e.g., 10 random number sequences R[0] to R[9] in the case of FIG. 10) (step S904). In this processing, the pseudo-random number generating unit 2202b uses the pseudo-random number generator to generate the pseudo-random number sequences. The pseudo-random number generating method is not particularly limited.

When it is determined in step S901 that the current special image processing is not the processing for a still image, the special image processing unit 2202 determines whether the current image data to be composed is the initial frame (step S905). When it is determined in step S905 that the current image data to be composed is the initial frame, the special image processing unit 2202 shifts the processing to step S902. No random seed is generated yet at the point of the initial frame. Therefore, a random seed is generated in step S902. When it is determined in step S905 that the current image data to be composed is not the initial frame, the special image processing unit 2202 shifts the processing to step S904. In this case, pseudo-random number sequences are generated in accordance with the setting of the pseudo-random number generator for the previous frame.

Figure 24:
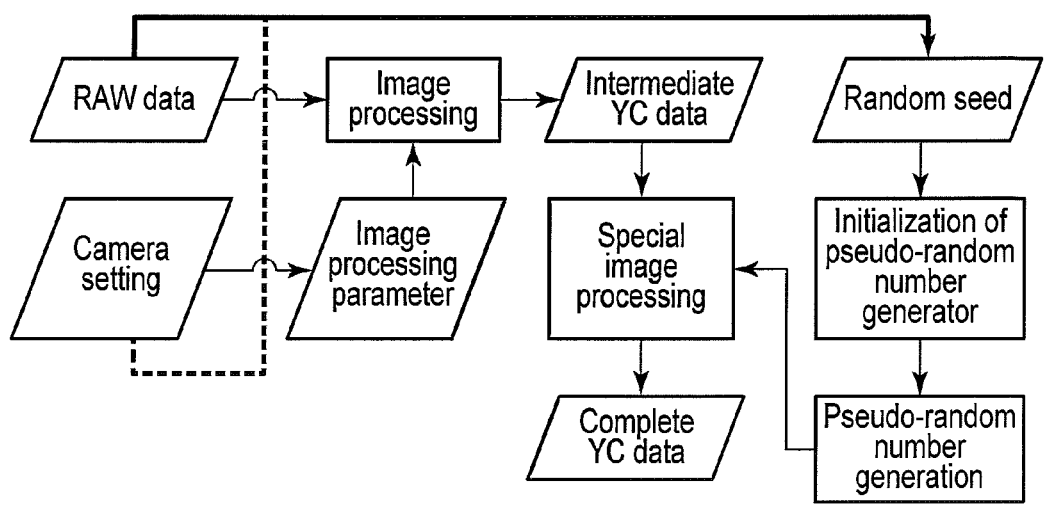
FIG. 24 is a conceptual diagram showing the flow of a procedure for generating a random seed by use of RAW data to perform the special image processing.

Now, an example of a random seed generating method is described. FIG. 24 is a conceptual diagram showing the flow of a procedure for generating a random seed by use of the RAW data to perform the special image processing. In the example of FIG. 24, a random seed is generated in accordance with the RAW data which is obtained by photography using the mechanical shutter or photography using the electronic shutter. By way of example, the value of particular coordinates of the RAW data is the random seed. The particular coordinates are, for example, the upper left coordinates of the RAW data or the coordinates of the center. Otherwise, the values of the coordinates of the RAW data may be combined to generate a random seed. For example, the result of adding up or subtracting the values of the coordinates of the RAW data can be a random seed, or the result of the exclusive OR of the values of the coordinates can be a random seed. Moreover, the camera settings can be combined with the RAW data to generate a random seed. For example, a numerical value may be allocated to a camera setting such as the white balance mode, the setting of the luminance changing processing, the contrast setting, and the sharpness setting, and this numerical value may be added to or subtracted from the random seed generated by the RAW data to produce a final random seed. Alternatively, an image processing parameter may be combined as in FIG. 25 described later to generate a random seed.

When the pseudo-random number generator is initialized in accordance with the random seed generated as in FIG. 24 to generate pseudo-random number sequences, a different pseudo-random number sequence can be generated each time RAW data is obtained by photography because the RAW data obtained by photography generally varies for every photograph. Therefore, an effect that varies for each photograph can be applied to the image. Since the random seed also varies with the variation of the camera settings, an effect that varies in each camera setting can be applied to the image even in the case of the same RAW data.

Figure 25:
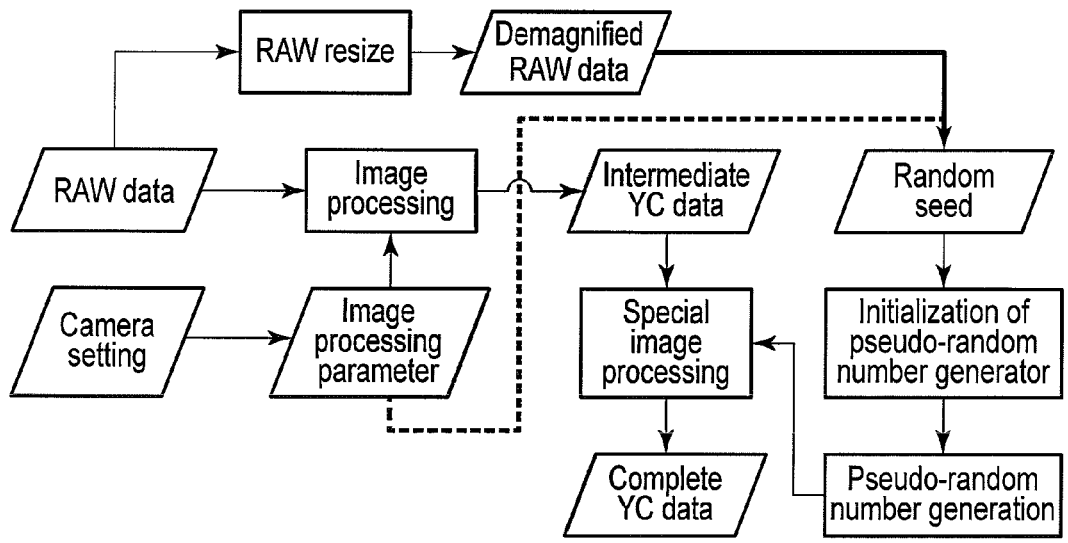
FIG. 25 is a conceptual diagram showing the flow of a procedure for generating a random seed by use of RAW data demagnified by a RAW resizing unit to perform the special image processing.

FIG. 25 is a conceptual diagram showing the flow of a procedure for generating a random seed by use of RAW data demagnified by the RAW resizing unit 210 to perform the special image processing. In the example of FIG. 25, data regarding particular coordinates of the demagnified RAW data is a random seed by way of example. The particular coordinates are, for example, the upper left coordinates of the RAW data or the coordinates of the center. Otherwise, data regarding the coordinates of the demagnified RAW data may be combined to generate a random seed. For example, the result of adding up or subtracting the data regarding the coordinates of the RAW data can be a random seed, or the result of the exclusive OR of the data regarding the coordinates can be a random seed. Moreover, an image processing parameter may be combined with the demagnified RAW data to generate a random seed. For example, an image processing parameter such as the white balance gain, a saturation/color tone correction coefficient, a gamma value, an edge enhancement degree, or noise reduction (NR) intensity may be added to or subtracted from the random seed generated by the RAW data to produce a final random seed. Alternatively, an image processing parameter such as the compression rate of a recorded image or the size of a recorded image may be used.

When data regarding several pixels of the demagnified RAW data are used to generate a random seed, it is possible to indirectly use information of more than several pixels to generate a random seed in the case of the RAW data before demagnification. That is, the demagnification is performed by the interpolation processing, so that it can be considered that data regarding certain coordinates in the interpolated RAW data includes information regarding the RAW data on the coordinates in the RAW data before demagnification. A random seed is thus generated based on the demagnified RAW data including more information than before demagnification, so that even if a photography condition such as the brightness of a scene is only slightly different, a different effect is easily applied to the image.

Figure 26:
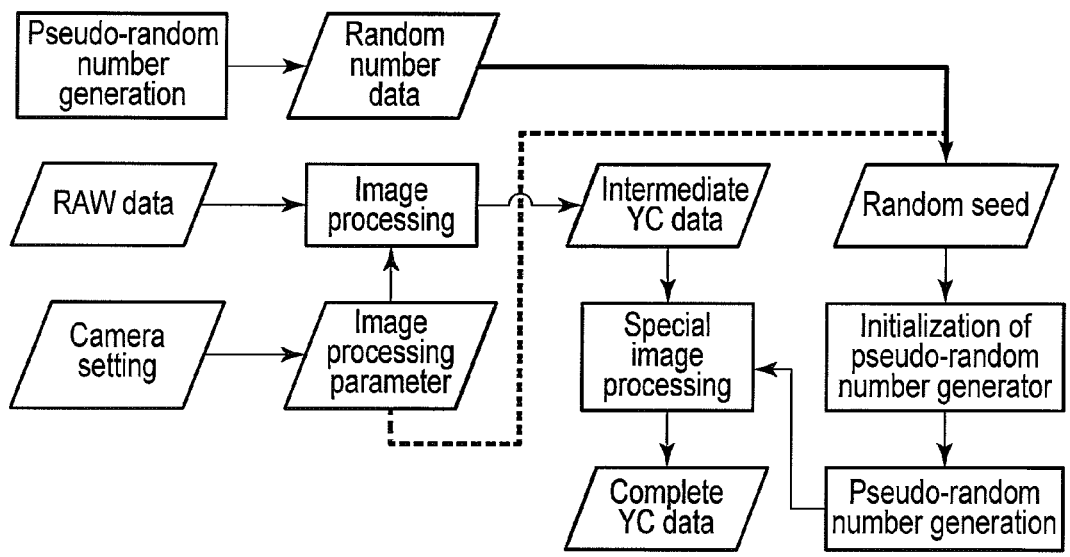
FIG. 26 is a conceptual diagram showing the flow of a procedure for generating a random seed by use of a random number generated during photography to perform the special image processing.

FIG. 26 is a conceptual diagram showing the flow of a procedure for generating a random seed by use of a random number generated during photography to perform the special image processing. The random number generated during photography is generated in, for example, the pseudo-random number generating unit 2202b. Here, the random number generated during photography does not always have to be the pseudo-random number. The random number generated during photography may be generated in a pseudo-random number generating unit different from the pseudo-random number generating unit 2202b. Here, in the example of FIG. 26 as well, the RAW data and the demagnified RAW data may be combined, or the camera setting or the image processing parameter may be combined to generate a final pseudo-random number.

As shown in FIG. 26, it is possible to apply an effect that varies for each photograph to the image by generating a random number for each photograph and generating a random seed in accordance with the generated random number.

FIG. 27 is a conceptual diagram showing the flow of a procedure for generating a random seed by use of the YC data (hereinafter referred to as intermediate YC data) obtained by subjecting the RAW data to the basic image processing to perform the special image processing. By way of example, the value of particular coordinates of the intermediate YC data is the random seed. The particular coordinates are, for example, the upper left coordinates of the intermediate YC data or the coordinates of the center. Otherwise, the values of the coordinates of the intermediate YC data may be combined to generate a random seed.

When the intermediate YC data is used to generate a random seed as shown in FIG. 27, it is possible to obtain advantageous effects similar to the advantageous effects obtained when a random seed is generated in consideration of the camera setting or the image processing parameter.

FIG. 28 is a conceptual diagram showing the flow of a procedure for generating a random seed by use various conditions during photography to perform the special image processing. In the example of FIG. 25, an exposure condition, a subject condition, and a camera state, for example, are used as the conditions for photography. The exposure condition is, for example, at least one of the shutter speed, the aperture value, and the ISO. The subject condition is, for example, the presence of a subject such as a face or a pet, the size, the position, and the number of, if any, subjects. The camera state is, for example, the temperature of the image pickup device 204, the internal temperature of the camera body 200, the remaining capacity of a battery, the kind, capacity, and remaining capacity of the recording medium 232, a focus position, and a zoom position, during photography. The exposure condition, the subject condition, and the camera state are converted to numerical values (when these are originally numerical values, these values can be used) if necessary, and the converted conditions are added or subtracted to generate a random seed. Here, in the example of FIG. 28 as well, image data such as the RAW data, the demagnified RAW data, and the intermediate YC data may be combined, or the camera setting or the image processing parameter may be combined to generate a final pseudo-random number.

As shown in FIG. 28, it is also possible to apply an effect that varies for each photograph to the image by generating a random seed using various conditions during photography. Here, as described above, the pseudo-random number sequence is characterized in that the same sequence is generated from the same random seed. Therefore, if information to generate a random seed is recorded, it is possible to perform the special image processing to later apply the noise effect to the image data for which the special image processing to apply the noise effect has not been performed at the time of the image processing during photography. FIG. 29A and FIG.

29B are diagrams showing file structures of image files when information for generating a random seed is recorded in an image file. FIG. 29A shows an example of a still image file recorded in the JPEG format (referred to as a JPEG file), and FIG. 29B shows an example of a RAW file. Moving image files are not shown. A moving image file has special structures as regards its image data and header information. There is no difference in the manner of recording information to generate a random seed between the moving image file and the still image file.

As shown in FIG. 29A, the JPEG file has a header recording portion, a thumbnail JPEG data recording portion, a main image JPEG data recording portion, and a screen-nail JPEG data recording portion.

The header recording portion is a recording portion for recording, as metadata, various kinds of information such as the exposure condition, the subject condition, and the camera state. FIG. 29A shows an example of how to record the exposure condition, the subject condition, and the camera state. In addition to the above information, information such as the camera setting and the image processing parameter may be recorded. Moreover, when a pseudo-random number is generated, the generated pseudo-random number may be directly recorded.

The thumbnail JPEG data recording portion is a recording portion for recording thumbnail display image data for still image reproduction after compression in the JPEG format. The main image JPEG data recording portion is a recording portion for recording still image data obtained by photography using the mechanical shutter 202 after compression in the JPEG format. The screen-nail JPEG data recording portion is a recording portion for recording screen-nail display image data after compression in the JPEG format.

As shown in FIG. 29B, the RAW file has a header recording portion, a thumbnail JPEG data recording portion, a RAW data recording portion, a demagnified RAW data recording portion, and a screen-nail JPEG data recording portion. The header recording portion is a recording portion for recording, as metadata, various kinds of information such as the exposure condition, the subject condition, and the camera state. FIG. 29B shows an example of how to record the exposure condition, the subject condition, and the camera state. There is little difference between the header recording portion of the JPEG file and that of the RAW file.

The thumbnail JPEG data recording portion is a recording portion for recording thumbnail display image data for RAW reproduction after compression in the JPEG format. The RAW data recording portion is a recording portion for recording RAW data obtained by photography using the mechanical shutter 202 or photography using the electronic shutter. The demagnified RAW data recording portion is a recording portion for recording demagnified RAW data necessary to generate a random seed by using the demagnified RAW data shown in FIG. 25. The screen-nail JPEG data recording portion is a recording portion for recording screen-nail display image data after compression in the JPEG format.

Figure 30:
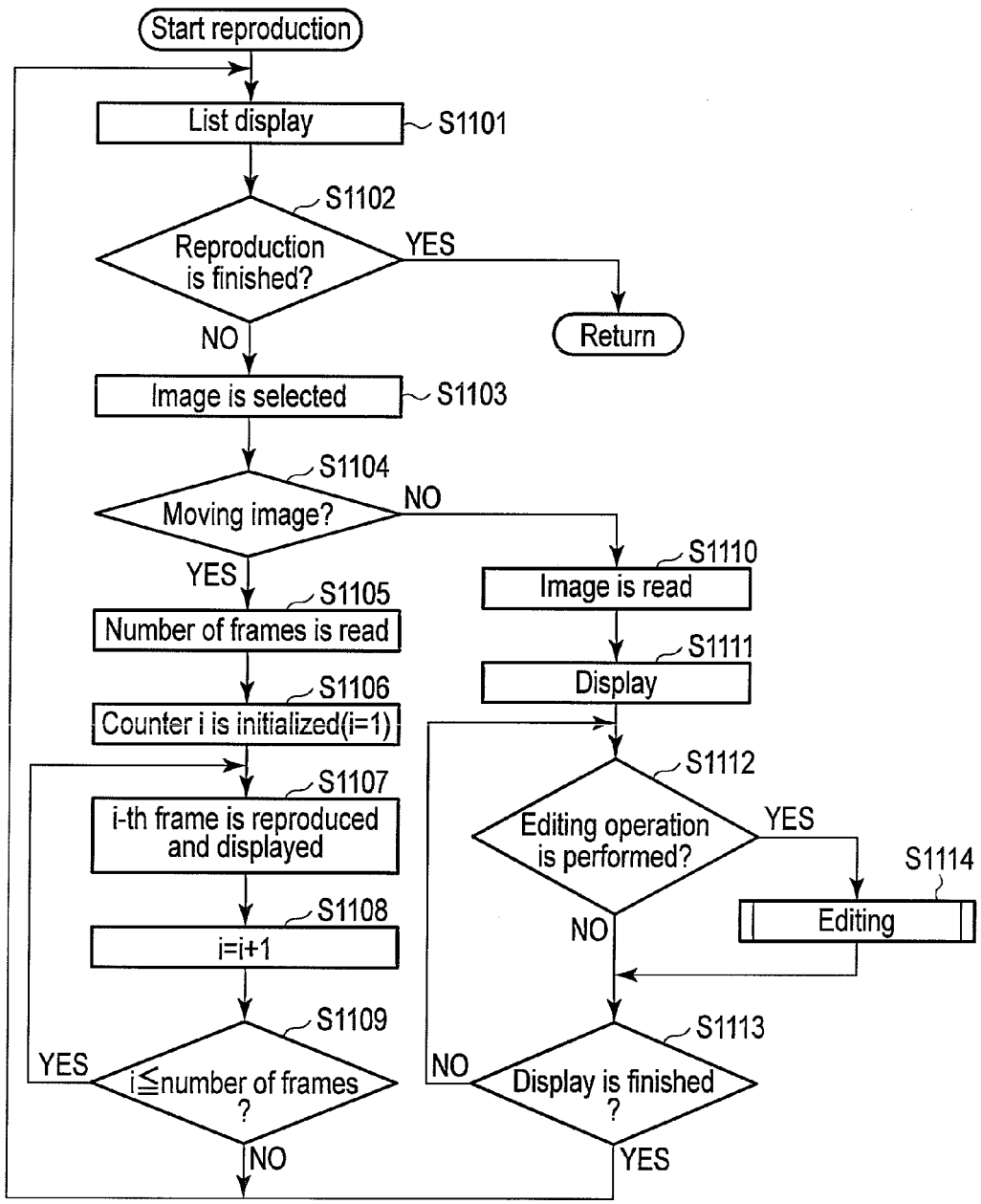
FIG. 30 is a flowchart showing reproduction processing.

Now, the reproduction processing is described. FIG. 30 is a flowchart showing the reproduction processing. In FIG. 30, the microcomputer 234 displays a list of image files recorded in the recording medium 232 (step S1101). In this processing, the microcomputer 234 reads the thumbnail JPEG data for the image files into the SDRAM 214. The microcomputer 234 then inputs the read thumbnail JPEG data to the image compressing/decompressing unit 228. The image compressing/decompressing unit 228 decompresses the input thumbnail JPEG data, and inputs the decompressed thumbnail JPEG data to the display driver 224. The display driver 224 displays the list of the image files on the display unit 226 based on the input thumbnail JPEG data.

After the display of the list, the microcomputer 234 determines whether to finish the reproduction processing (step S1102). For example, when the reproduction button is pressed again, the microcomputer 234 determines to finish the reproduction. When it is determined in step S1102 to finish the reproduction processing, the microcomputer 234 finishes the processing in FIG. 30.

When it is determined in step S1102 not to finish the reproduction processing, the microcomputer 234 waits for the user to select an image file (step S1103). When the user operates the operating unit 236 to select an image file on the displayed list, the microcomputer 234 determines whether the selected image file is a moving image file (step S1104).

When it is determined in step S1104 that the selected image file is a moving image file, the microcomputer 234 reads the number of frames in moving image data recorded in the selected moving image file (step S1105). The microcomputer 234 then initializes the count value i of the number of frames in the moving image data to be reproduced (step S1106). The initial value of the count value is, for example, 1.

The microcomputer 234 then reproduces the i-th frame in the moving image data recorded in the selected moving image file, and displays the frame on the display unit 226 (step S1107). In this processing, the microcomputer 234 reads the i-th frame in the moving image data recorded in the moving image file selected by the user into the SDRAM 214. The microcomputer 234 then inputs the read moving image data of the i-th frame to the image compressing/decompressing unit 228. The image compressing/decompressing unit 228 decompresses the input moving image data, and inputs the decompressed moving image data to the display driver 224. The display driver 224 displays an image corresponding to the input moving image data of the i-th frame on the display unit 226.

After the reproduction and display of the i-th frame of the moving image data, the microcomputer 234 adds 1 to the count value (step S1108). The microcomputer 234 then determines whether the count value i is equal to or lower than the number of frames, that is, whether the reproduction of all the frames has finished (step S1109). When the count value i is equal to or lower than the number of frames in step S1109, frames to be reproduced still remain. In this case, the microcomputer 234 returns the processing to step S1107 and then reproduces and displays the next frame. When the count value i is higher than the number of frames in step S1109, this means that the reproduction of moving image file has finished. In this case, the microcomputer 234 returns the processing to step S1101.

When it is determined in step S1104 that the selected image file is not a moving image file, that is, a still image file, the microcomputer 234 reads still image data recorded in the selected still image file (step S1110). The microcomputer 234 then reproduces the read still image data (when the file structure is the file structure shown in FIG. 29A or FIG. 29B, the still image data is the main image JPEG in the case of JPEG or the screen-nail JPEG in the case of RAW), and displays the still image data on the display unit 226 (step S1111). In this processing, the microcomputer 234 inputs the read still image data to the image compressing/decompressing unit 228. The image compressing/decompressing unit 228 decompresses the input still image data, and inputs the decompressed still image data to the display driver 224. The display driver 224 displays an image corresponding to the input still image data on the display unit 226.

The microcomputer 234 then determines whether the user has performed an editing operation (step S1112). The editing operation is an operation for the user to select an item to apply the noise effect from the menu. In this case, the operating unit 236 necessary for the selection operation functions as an example of an instruction unit. Editing operations to apply effects other than the noise effect may be similar to conventional editing operations, and are therefore not described.

When it is determined in step S1112 that the editing operation has not been performed, the microcomputer 234 determines whether to finish the display of the still image (step S1113). For example, when the menu button is pressed by the user, the microcomputer 234 determines to finish the display. When it is determined in step S1113 not to finish the display, the microcomputer 234 returns the processing to step S1112. In this case, the display of the still image is continued. When it is determined in step S1113 to finish the display, the microcomputer 234 finishes the processing in FIG. 30.

When it is determined in step S1112 that the editing operation has been performed, the microcomputer 234 performs editing processing (step S1114). The editing processing is further described below with reference to FIG. 31. Here, the processing in step S1114 is the processing for a still image file. However, the processing described below is also applicable to a moving image file.

FIG. 31 is a flowchart showing the editing processing. In FIG. 31, the microcomputer 234 reads a still image file to be currently edited (step S1201). The microcomputer 234 then determines whether the read still image file is a RAW file (step S1202). When it is determined in step S1202 that the still image file is a RAW file, the microcomputer 234 performs image processing for this RAW file (step S1203). The image processing in step S1203 is the same as the image processing shown in FIG. 4. Since the still image file is a RAW file, both the basic image processing and the special image processing are performed. Here, a pseudo-random number necessary for the special image processing can be generated from a random seed which is generated by the combination of the RAW data (or the demagnified RAW data), the camera setting, and the image processing parameter, as described above. In this case, the camera setting recorded in the header recording portion of the RAW file may be used, or the camera setting newly set by the user at the time of the editing processing may be used. When the camera setting recorded in the header recording portion is used, the same noise effect as that during photography can be applied. On the other hand, when the camera setting newly set by the user is used, the noise effect corresponding to the change can be applied. When it is determined in step S1202 that the still image file is not a RAW file, that is, the still image file is a JPEG file, the microcomputer 234 performs special image processing for this JPEG file (step S1204). The special image processing in step S1204 is the same as the special image processing shown in FIG. 6. Here, a pseudo-random number necessary for the special image processing can be generated from a random seed which is generated by the combination of various conditions during photography, the camera setting, and the image processing parameter, as described above. In this case, the camera setting recorded in the header recording portion of the JPEG file may be used, or the camera setting newly set by the user at the time of the editing processing may be used. When the camera setting recorded in the header recording portion is used, the same noise effect as that during photography can be applied. On the other hand, when the camera setting newly set by the user is used, the noise effect corresponding to the change can be applied.

As described above, in the present embodiment, parts of the scratch image data and the noise image data are randomly cut out, and the scratch image data, the noise image data, and the dust image data are then composed to generate composite noise image data. Further, the composite noise image data is composed with the image data to be composed. Thus, a specific noise shown during film photography is decomposed and then composed in the present embodiment, so that a natural sense of noise can be provided to the user without the recording of long-time moving image data.

The scratch image data is demagnified and then recorded by taking advantage of the fact that the scratch image data is characterized by being highly correlated in one direction. As a result, it is possible to save the capacity to record the scratch image data.

When the sizes of the scratch image data and the noise image data do not correspond to the size of the image data to be composed, processing is performed so that the sizes of the scratch image data and the noise image data correspond to the size of the image data to be composed. As a result, the scratch image data and the noise image data do not need to be recorded any longer for each size of the image data to be composed.

In the present embodiment, a random seed is generated from the RAW data obtained by photography, the camera setting during photography, and the image processing parameter, and pseudo-random numbers to apply the noise effect, the shading effect, and the granular noise effect are generated in accordance with the random seed. As a result, the effect suited to the situation during photography can be applied.

Here, in the present embodiment, three kinds of data: the scratch image data, the noise image data, and the dust image data are composed with the image data to be composed. Actually, not all the image data need to be composed. For example, the dust image data may not be composed.

The method of each process performed by the imaging apparatus in the embodiment described above, that is, the processing shown in each flowchart can be stored as a program executable by the microcomputer 234. Otherwise, the program can be stored and distributed in a storage medium of an external storage device such as a memory card (e.g., a ROM card, a RAM card), a magnetic disk (e.g., a floppy disk, a hard disk), an optical disk (e.g., a CD-ROM, a DVD), or a semiconductor memory. The microcomputer 234 then reads the program stored in the storage medium of the external storage device, and the operation of the microcomputer 234 is controlled by the read program, so that the microcomputer 234 can perform the processing described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging unit which photographs a subject to obtain image data;
   a storage unit which stores film noise effect generating image data, wherein the film noise effect generating image data includes scratch image data, noise image data and dust image data, the scratch image data and the noise image data are larger than the image data, and the film noise effect image data is obtained by combining the scratch image data, noise image data and dust image data multiplied by a gain in the range of 0 to 1;

a random seed generating unit which generates a random seed to decide a pseudo-random number sequence;

a pseudo-random number generating unit which generates a pseudo-random number in accordance with the generated random seed;

a cut out range deciding unit which decides a cut out range of the film noise effect generating image data based on the generated pseudo-random number, wherein a lateral size of the cut out range is the same as that of the image data; and a special image processing unit which cuts out a part of the film noise effect generating image data based on the cut out range, resizes a longitudinal size of the film noise effect image data in the cut out range in accordance with a longitudinal size of the image data, and combines the resized film noise effect image data with the image data, wherein the random seed is decided during photography.

2. The imaging apparatus according to claim 1, further comprising an instruction unit which instructs to perform special image processing for the image data, wherein the special image processing unit subjects the image data to the special image processing in accordance with the instruction from the instruction unit.

3. The imaging apparatus according to claim 1, wherein the random seed generating unit generates the random seed based on at least one of the image data, an exposure condition during photography, a subject condition during photography, a camera state during photography, and a random number calculated during photography.

4. The imaging apparatus according to claim 3, wherein the random seed generating unit generates the random seed further based on an image processing parameter used in the image processing provided to the image data.

5. The imaging apparatus according to claim 4, wherein the image processing parameter includes at least one of a white balance setting in the image data, a contrast setting in the image data, a saturation setting in the image data, an edge enhancement degree setting in the image data, a noise reduction intensity setting in the image data, a compression rate of the image data, and the size of the image data.

6. The imaging apparatus according to claim 4, wherein the random seed generating unit generates the random seed by use of intermediate image data which is obtained by image processing of the image data based on the image processing parameter.

7. The imaging apparatus according to claim 3, wherein the random seed generating unit generates the random seed by use of demagnified image data which is obtained by demagnifying the image data.

8. An image processing apparatus comprising:

a storage unit which stores film noise effect generating image data, wherein the film noise effect generating image data includes scratch image data, noise image data and dust image data, the scratch image data and the noise image data are larger than subject image data obtained from an imaging unit, and the film noise effect image data is obtained by combining the scratch image data, noise image data and dust image data multiplied by a gain in the range of 0 to 1;

a random seed generating unit which generates a random seed to decide a pseudo-random number sequence;

a pseudo-random number generating unit which generates a pseudo-random number in accordance with the generated random seed;

a cut out range deciding unit which decides a cut out range of the film noise effect generating image data based on the generated pseudo-random number, wherein a lateral size of the cut out range is the same as that of the subject image data; and a special image processing unit which cuts out a part of the film noise effect generating image data based on the cut out range, resizes a longitudinal size of the film noise effect image data in the cut out range in accordance with a longitudinal size of the subject image data, and combines the resized film noise effect image data with the subject image data, wherein the random seed is decided during the acquisition of the subject image data.

9. The image processing apparatus according to claim 8, further comprising an instruction unit which instructs to perform special image processing for the subject image data, wherein the special image processing unit subjects the subject image data to the special image processing in accordance with the instruction from the instruction unit.

10. The image processing apparatus according to claim 8, wherein the random seed generating unit generates the random seed based on at least one of the subject image data, an exposure condition during photography, a subject condition during photography, a camera state during photography, and a random number calculated during photography.

11. The image processing apparatus according to claim 10, wherein the random seed generating unit generates the random seed further based on an image processing parameter used in the image processing provided to the subject image data.

12. The image processing apparatus according to claim 11, wherein the random seed generating unit generates the random seed by use of intermediate image data which is obtained by image processing of the subject image data based on the image processing parameter.

13. The image processing apparatus according to claim 10, wherein the random seed generating unit generates the random seed by use of demagnified image data which is obtained by demagnifying the subject image data.

14. An image processing method comprising:

storing film noise effect generating image data, wherein the film noise effect generating image data includes scratch image data, noise image data and dust image data, the scratch image data and the noise image data are larger than subject image data obtained from an imaging unit, and the film noise effect image data is obtained by combining the scratch image data, noise image data and dust image data multiplied by a gain in the range of 0 to 1;

generating a random seed by use of information obtained during an acquisition of image data in response to an instruction to perform special image processing for the subject image data;

generating a pseudo-random number in accordance with the generated random seed;

determining a cut out range of the film noise effect generating image data based on the generated pseudo-random number, wherein a lateral size of the cut out range is the same as that of the subject image data;

cutting out a part of the film noise effect generating image data based on the cut out range;

resizing a longitudinal size of the film noise effect image data in the cut out range in accordance with a longitudinal size of the subject image data to generate resized film noise effect image data; and combining the resized film noise effect image data with the subject image data.

15. The image processing method according to claim 14, further comprising instructing to perform special image processing for the subject image data, wherein the special image processing special image processing is performed in accordance with the instruction.

16. The image processing method according to claim 14, wherein the random seed is generated based on at least one of the subject image data, an exposure condition during photography, a subject condition during photography, a camera state during photography, and a random number calculated during photography.

17. The image processing method according to claim 16, wherein the random seed is generated further based on an image processing parameter.

18. The imaging processing method according to claim 17, wherein the random seed is generated by use of intermediate image data which is obtained by image processing of the subject image data based on the image processing parameter.

19. The imaging processing method according to claim 16, wherein the random seed is generated by use of demagnified image data which is obtained by demagnifying the subject image data.

20. A non-transitory recording medium on which an image processing program causing a computer to execute:

storing film noise effect generating image data, wherein the film noise effect generating image data includes scratch image data, noise image data and dust image data, the scratch image data and the noise image data are larger than subject image data obtained from an imaging unit, and the film noise effect image data is obtained by combining the scratch image data, noise image data and dust image data multiplied by a gain in the range of 0 to 1;

generating a random seed by use of information obtained during an acquisition of image data in response to an instruction to perform special image processing for the subject image data;

generating a pseudo-random number in accordance with the generated random seed;

determining a cut out range of the film noise effect generating image data based on the generated pseudo-random number, wherein a lateral size of the cut out range is the same as that of the subject image data;

cutting out a part of the film noise effect generating image data based on the cut out range;

resizing a longitudinal size of the film noise effect image data in the cut out range in accordance with a longitudinal size of the subject image data to generate resized film noise effect image data; and combining the resized film noise effect image data with the subject image data.

\* \* \* \* \*